(12) United States Patent
Hao

(10) Patent No.: US 10,760,936 B2
(45) Date of Patent: Sep. 1, 2020

(54) SEMICONDUCTOR DEVICE AND METHOD OF SENSING A CHANGE IN A LEVEL OF A LIQUID THEREIN

(71) Applicant: NANYA TECHNOLOGY CORPORATION, New Taipei (TW)

(72) Inventor: Chung-Peng Hao, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 117 days.

(21) Appl. No.: 16/179,119

(22) Filed: Nov. 2, 2018

(65) Prior Publication Data

US 2020/0141786 A1    May 7, 2020

(51) Int. Cl.
  *G01F 23/24* (2006.01)
  *G01N 13/02* (2006.01)
  *G01N 27/06* (2006.01)
(52) U.S. Cl.
  CPC .............. *G01F 23/24* (2013.01); *G01N 13/02* (2013.01); *G01N 27/06* (2013.01)
(58) Field of Classification Search
  CPC ......... G01F 23/24; G01N 27/06; G01N 13/02
  See application file for complete search history.

(56) References Cited

U.S. PATENT DOCUMENTS

| RE47,067 E | * | 10/2018 | Turner | ................. G01N 27/447 |
| 2011/0312841 A1 | * | 12/2011 | Silverbrook | ........ F16K 99/0036 506/40 |
| 2019/0021622 A1 | * | 1/2019 | Ram | ....................... A61B 3/16 |

FOREIGN PATENT DOCUMENTS

TW    201832629 A    9/2018

OTHER PUBLICATIONS

Office Action dated Jan. 17, 2020 related to Taiwanese Application No. 107147423.

* cited by examiner

*Primary Examiner* — Francis C Gray
(74) *Attorney, Agent, or Firm* — Muncy, Geissler, Olds & Lowe, P.C.

(57) ABSTRACT

The present disclosure provides a semiconductor device. The semiconductor device includes a substrate, a pair of walls and a conductive layer. The pair of walls, disposed on the substrate, are configured to define a recess therebetween to receive a liquid. The conductive layer is disposed above the substrate, and has a resistance, wherein the resistance is correlated with a surface tension of the liquid in the recess.

14 Claims, 26 Drawing Sheets

SEMICONDUCTOR DEVICE AND METHOD OF SENSING A CHANGE IN A LEVEL OF A LIQUID THEREIN

TECHNICAL FIELD

The present disclosure relates to a semiconductor device and a method of sensing a change in a level of a liquid contained therein, and more particularly, to a semiconductor device that can identify types of liquid contained therein.

DISCUSSION OF THE BACKGROUND

Surface tension is the elastic tendency of a fluid surface that makes the fluid acquire the least surface area possible. At liquid-air interfaces, surface tension results from the greater attraction of liquid molecules to each other (due to cohesion) than to the molecules in the air (due to adhesion). The net effect is an inward force at its surface that causes the liquid to behave as if its surface were covered with a stretched elastic membrane. Thus, the surface is under tension as a result of the imbalanced forces. Because of the relatively high attraction of water molecules to each other through a web of hydrogen bonds, water has a higher surface tension (72.8 mN/m at 20° C.) compared to that of most other liquids.

This Discussion of the Background section is for background information only. The statements in this Discussion of the Background are not an admission that the subject matter disclosed in this section constitutes a prior art to the present disclosure, and no part of this section may be used as an admission that any part of this application, including this Discussion of the Background section, constitutes prior art to the present disclosure.

SUMMARY

One aspect of the present disclosure provides a semiconductor device. The semiconductor device includes a substrate, a pair of walls and a conductive layer. The pair of walls, disposed on the substrate, are configured to define a recess therebetween to receive a liquid. The conductive layer is disposed above the substrate, and has a resistance, wherein a variation in the resistance is correlated with a surface tension of the liquid in the recess.

In some embodiments, the conductive layer is in contact with the pair of walls.

In some embodiments, the semiconductor device further includes an insulation layer. The insulation layer is disposed on the substrate.

In some embodiments, the conductive layer and the insulation layer are in contact with the pair of walls.

In some embodiments, the semiconductor device further includes a first pad and a second pad. The first pad is disposed above the insulation layer. The second pad is disposed above the insulation layer. The first pad and the second pad in combination serve as a medium for measuring the resistance of the conductive layer.

In some embodiments, the pair of walls are a first pair of walls. The recess is a first recess. The liquid is a first liquid. The semiconductor device further includes a second pair of walls. The second pair of walls, disposed on the substrate, are configured to define a second recess therebetween to receive a second liquid. The variation in the resistance is correlated with both the surface tension of the first liquid in the first recess and a surface tension of the second liquid in the second recess. The first pair of walls and the second pair of walls are respectively disposed at opposite sides of the conductive layer. A type of the first liquid is the same as a type of the second liquid.

In some embodiments, the semiconductor device further includes a first pad and a second pad. The first pad is for measuring the resistance. The second pad is for measuring the resistance. A location of the first pad and a location of the second pad are substantially symmetrical with respect to a center line of the conductive layer.

In some embodiments, the semiconductor device further includes an insulation layer. The insulation layer is disposed on the substrate, wherein the first pad and the second pad are disposed above the insulation layer.

Another aspect of the present disclosure provides a semiconductor device. The semiconductor device includes a substrate, a pair of walls and a conductive layer. The pair of walls, disposed on the substrate, are configured to define a recess therebetween to receive a liquid. The conductive layer is disposed above the substrate, and is deformable by the pair of walls in response to a surface tension of the liquid.

In some embodiments, the conductive layer is in contact with the pair of walls.

In some embodiments, the semiconductor device further includes an insulation layer. The insulation layer is disposed on the substrate.

In some embodiments, the conductive layer and the insulation layer are in contact with the pair of walls.

In some embodiments, the semiconductor device further includes a first pad and a second pad. The first pad is disposed above the insulation layer. The second pad is disposed above the insulation layer. The first pad and the second pad in combination serve as a medium for measuring the resistance of the conductive layer.

In some embodiments, the pair of walls are a first pair of walls. The recess is a first recess. The liquid is a first liquid. The semiconductor device further includes a second pair of walls. The second pair of walls, disposed on the substrate, are configured to define a second recess therebetween to receive a second liquid. A type of the first liquid is the same as a type of the second liquid. The first pair of walls and the second pair of walls are respectively disposed at opposite sides of the conductive layer. The conductive layer is deformable by the second pair of walls in response to a surface tension of the second liquid.

In some embodiments, the semiconductor device further includes a first pad and a second pad. The first pad is disposed above the insulation layer. The second pad is disposed above the insulation layer. A location of the first pad and a location of the second pad are substantially symmetrical with respect to a center line of the conductive layer. The first pad and the second pad in combination serve as a medium for measuring the resistance of the conductive layer.

Another aspect of the present disclosure provides a method of sensing a change in a level of a liquid contained in a semiconductor device. The semiconductor device includes a substrate, a pair of walls disposed on the substrate and configured to define a recess therebetween, and a conductive layer disposed above the substrate. The method includes applying a liquid to completely fill the recess between the pair of walls; measuring a resistance of the conductive layer in contact with the pair of walls; and determining that an amount of the liquid is decreased when the measured resistance is changed.

In the present disclosure, the semiconductor device facilitates identifying the type of the liquid in the semiconductor device. There is no need to taste, smell or touch the liquid. Such actions might be harmful to human health.

The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should be understood to be connected to the figures' reference numbers, which refer to similar elements throughout the description.

DETAILED DESCRIPTION

Figure 1:
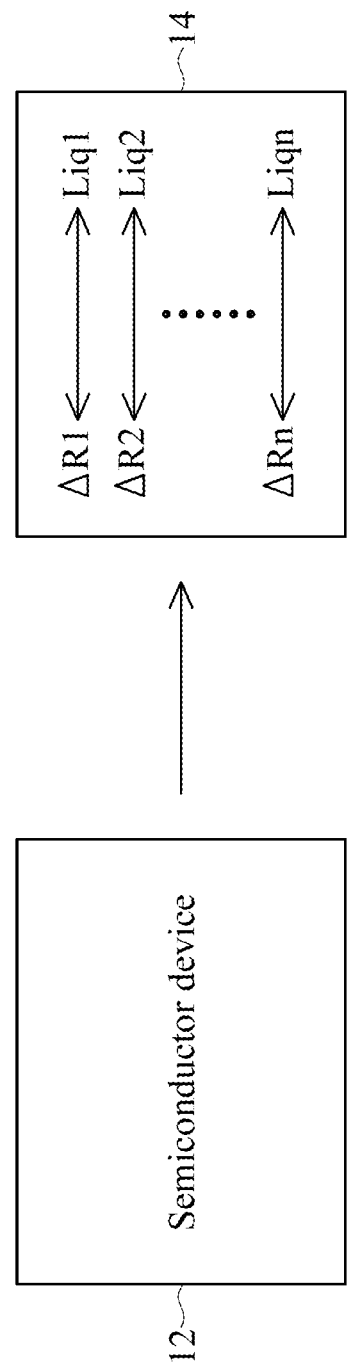
FIG. 1 is a schematic diagram of an apparatus including a semiconductor device, in accordance with some embodiments of the present disclosure.

Embodiments of the disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, an apparatus in accordance with the present disclosure. It should be understood that elements not specifically shown or described may take various forms. Reference throughout this specification to "some embodiments" or "an embodiment" means that a particular feature, structure, or characteristic described in connection with the embodiment is included in at least one embodiment. Thus, the appearances of the phrases "in some embodiments" or "in an embodiment" in various places throughout this specification do not necessarily refer to the same embodiment. Furthermore, the particular features, structures, or characteristics may be combined in any suitable manner in one or more embodiments.

In the drawings, like reference numbers are used to designate like or similar elements throughout the various views, and illustrative embodiments of the present invention are shown and described. The figures are not necessarily drawn to scale, and in some instances the drawings have been exaggerated and/or simplified in places for illustrative purposes only. A person having ordinary skill in the art will appreciate the many possible applications and variations of the present invention based on the following illustrative embodiments of the present invention.

Unless otherwise defined, all terms (including technical and scientific terms) used herein have the same meaning as commonly understood by a person having ordinary skill in the art to which the embodiments of the present disclosure belong. It should be understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

FIG. 1 is a schematic diagram of an apparatus 10 including a semiconductor device 12, in accordance with some embodiments of the present disclosure. Referring to FIG. 1, in addition to the semiconductor device 12, the apparatus 10 further includes a system 14.

The semiconductor device 12 functions to provide a resistance value to the system 14, wherein a variation in the resistance is correlated with a surface tension of a liquid in the semiconductor device 12.

The system 14 functions to store a plurality of relationships between a variation of a resistance and a type of a liquid. For example, the system 14 stores a relationship between a first variation $\Delta R1$ of a resistance and a first type of a liquid Liq1, for example, water. Similarly, the system 14 stores a relationship between a second variation $\Delta R2$ of a resistance and a second type of a liquid Liq2, for example, acid. In addition, the system 14 stores a relationship between an nth variation $\Delta Rn$ of a resistance and an nth type of a liquid Liqn, wherein n is a positive integer. Accordingly, the system 14 indexes the plurality of relationships with the variation provided by the semiconductor device 12, thereby identifying the type of the liquid contained in the semiconductor device 12. As a result, the semiconductor device 12 facilitates identifying the type of the liquid in the semiconductor device 12. There is no need to taste, smell or touch the liquid. Such actions might be harmful to human health. In some embodiments, the semiconductor device 12 is a disposable, single-use device. After the semiconductor device 12 is used, the semiconductor device 12 can be disposed. Such a design is relatively convenient.

Figure 2:
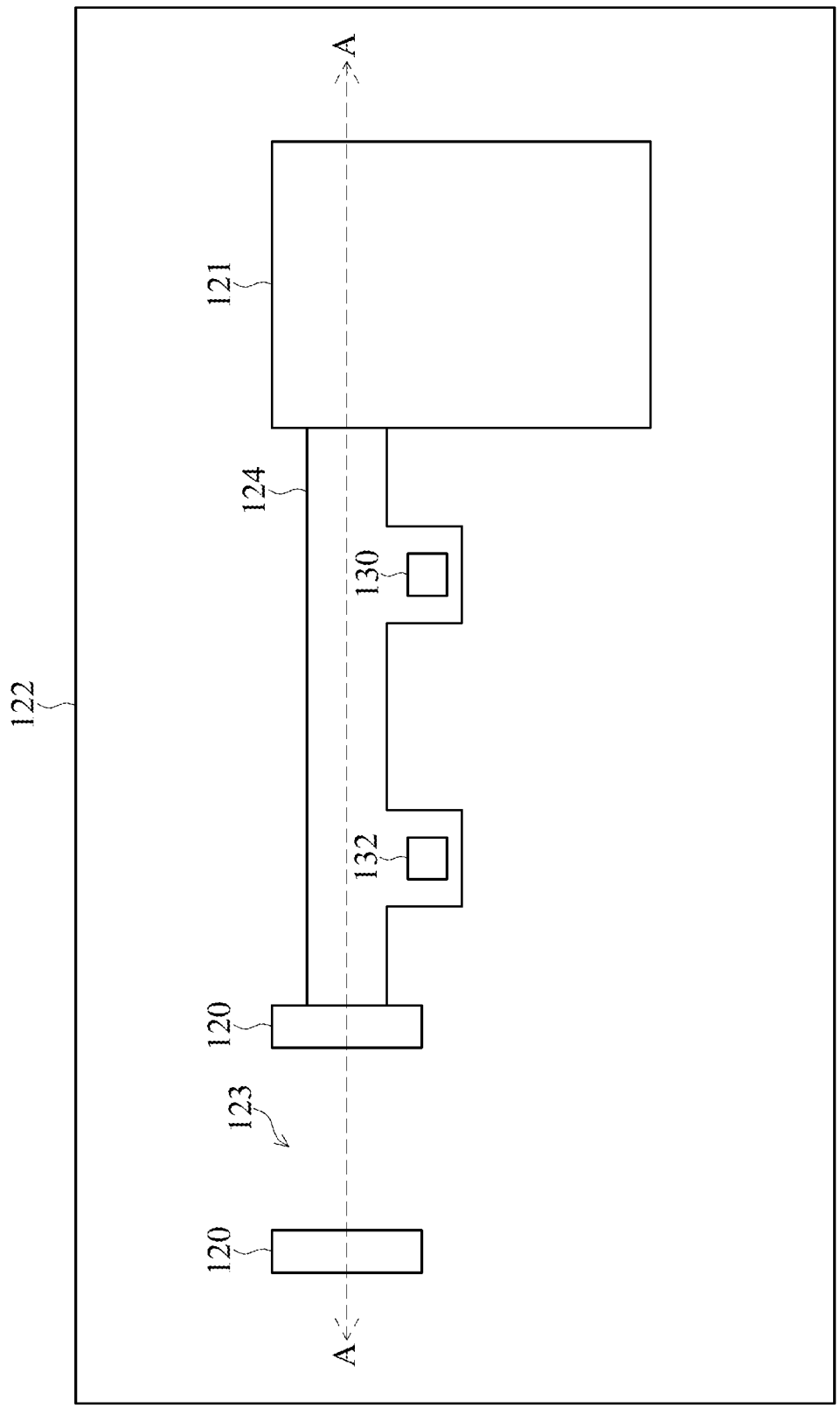
FIG. 2 is a top view of the semiconductor device shown in FIG. 1, in accordance with some embodiments of the present disclosure.

FIG. 2 is a top view of the semiconductor device 12 shown in FIG. 1, in accordance with some embodiments of the present disclosure. Referring to FIG. 2, the semiconductor device 12 includes a pair of walls 120 disposed on a substrate 122, a conductive layer 124 and a fixer 121.

In some embodiments, the substrate 122 includes a wafer over which devices such as semiconductor devices or other devices are formed. In some embodiments, the substrate 122 includes a semiconductor substrate, such as a bulk semiconductor substrate. The bulk semiconductor substrate includes an elementary semiconductor, such as silicon or germanium; a compound semiconductor, such as silicon germanium, silicon carbide, gallium arsenic, gallium phosphide, indium phosphide, or indium arsenide; or combinations thereof. In some embodiments, the substrate 122 includes a multilayered substrate, such as a silicon-on-insulator (SOI) substrate, which includes a bottom semiconductor layer, a buried oxide layer (BOX) and a top semiconductor layer.

In some embodiments, the substrate 122 may be a p-type doped substrate, or an n-type doped substrate, which means that the semiconductor substrate 122 may be doped with either n-type or p-type impurities. A p-type material may be further classified as a p++, p+, p, p−, or p−− type material, depending on the concentration of the dopant. If a material is stated to be a p-type material, it is doped with p-type impurities and it may be any of the p++, p+, p, p−, or p−− type materials. Similarly, an n-type material may be further classified as an n++, n+, n, n−, or n−− type material. If a material is stated to be an n-type material, it is doped with n-type impurities and it may be any of the n++, n+, n, n−, or n−− type materials. Dopant atoms for p-type materials include boron, for example. In n-type materials, dopant atoms include phosphorous, arsenic, and antimony, for example. Doping may be performed through ion implantation processes. In some embodiments, the substrate 122 is formed from silicon, gallium arsenide, silicon germanium, silicon carbon, or other known semiconductor materials used in semiconductor device processing.

Figure 3:
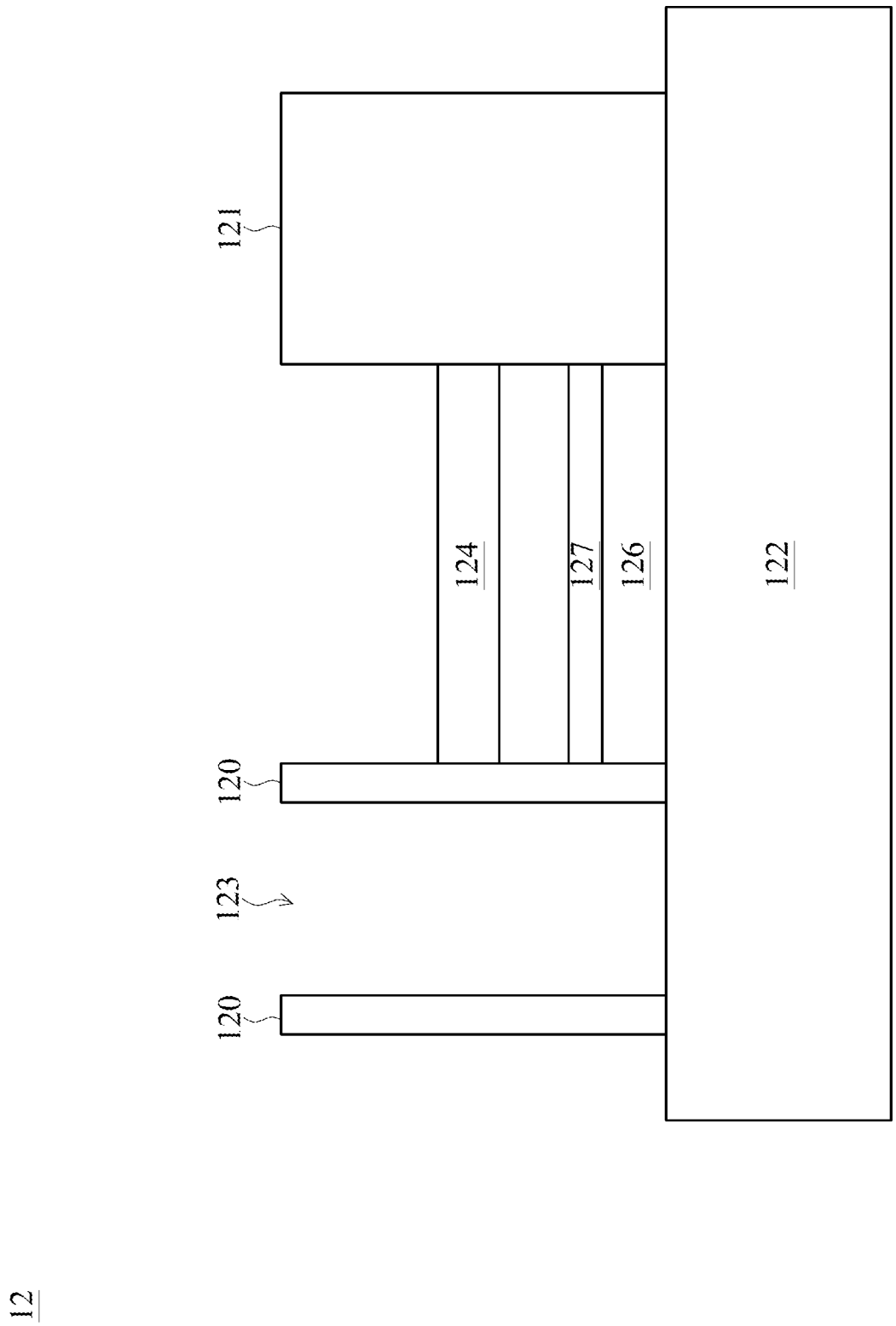
FIG. 3 is a cross-sectional diagram of the semiconductor device shown in FIG. 1 taken along a line A-A, in accordance with some embodiments of the present disclosure.

The pair of walls 120 function to define a recess 123 therebetween to receive a liquid 110 as illustrated in FIG. 3. The pair of walls 120 may be made of any semiconductor material that responds to a surface tension of the liquid 110. For example, the pair of walls 120 are made of poly, metal or oxide.

The conductive layer 124, disposed above the substrate 122, has a resistance, and is deformable by the pair of walls 120 in response to a surface tension of the liquid 110 as illustrated in detail with reference to FIG. 4. The resistance can be measured by a medium served by pads 130 and 132 disposed above the conductive layer 124. The pads 130 and 132 are coupled to the conductive layer 124 via a redistribution layer (not shown) using well-known techniques familiar to those skilled in the art. The redistribution layer may include any number of dielectric layers, metallization patterns, and vias.

The fixer 121 functions to fix one end of the conductive layer 124. The fixer 121 may be made of any semiconductor material. For example, the fixer 121 are made of poly, metal or oxide.

FIG. 3 is a cross-sectional diagram of the semiconductor device 12 shown in FIG. 2 taken along a line A-A, in accordance with some embodiments of the present disclosure. Referring to FIG. 3, the semiconductor device 12 further includes an insulation layer 126 and an etching stop layer 127.

The insulation layer 126 functions to electrically isolate the substrate 122 from semiconductor components, such as the pads 30 and 32 shown in FIG. 2, formed above the substrate 122.

In some embodiments, the insulation layer 126 is a single-layered structure, which may be formed of a dielectric material such as silicon oxide, silicon nitride or other suitable dielectric or insulative materials. In some embodiments, the insulation layer 126 is a multi-layered structure, which includes a plurality of dielectric films. For example, the multi-layered dielectric layer includes silicon oxide-silicon nitride (ON) dielectric layer, silicon oxide-silicon nitride-silicon oxide (ONO) dielectric layer, or any other suitable dielectric film stack. In some embodiments, the insulation layer 126 may be formed of a polymer, which may also be a photosensitive material such as polybenzoxazole (PBO), polyimide, benzocyclobutene (BCB), or the like. In accordance with alternative embodiments of the present disclosure, the insulation layer 126 is formed of inorganic material(s), which may include a nitride such as silicon nitride, an oxide such as silicon oxide, PhosphoSilicate Glass (PSG), BoroSilicate Glass (BSG), Boron-doped PhosphoSilicate Glass (BPSG), or the like.

The etching stop layer 127 is disposed on the insulation layer 126. In some embodiments, the etching stop layer 127 includes SiN.

The conductive layer 124 is in contact with the pair of walls 120. However, the present disclosure is not limited thereto. In other embodiments, the conductive layer 124 is attached to the pair of walls 120 via an adhesive layer. In further detail, one end of the conductive layer 124 is attached to one of the pair of walls 120, and the other end of the conductive layer 124 is attached to the fixer 121. The conductive layer 124 is suspended from the one of the pair of walls 120 and the fixer 121, and is not in contact with any semiconductor components, such as the etching stop layer 127. Accordingly, the conductive layer 124 is movable and deformable.

In some embodiments, cross-sectional view shapes of the conductive layer 124 include straight line, serpentine line or other suitable shapes.

Figure 4:
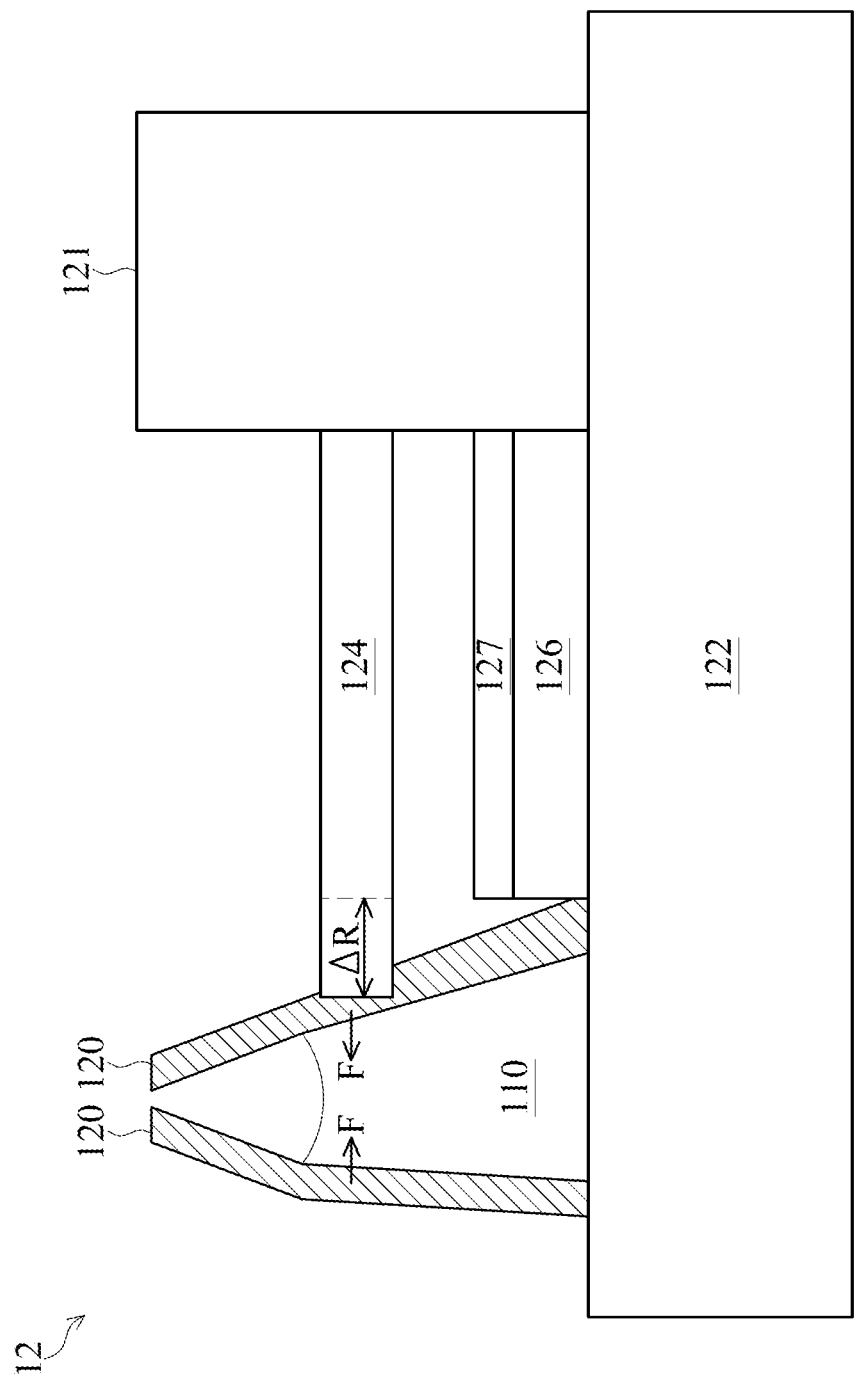
FIG. 4 is a schematic diagram illustrating a test performed by the semiconductor device shown in FIG. 3, in accordance with some embodiments of the present disclosure.

FIG. 4 is a schematic diagram illustrating a test performed by the semiconductor device 12 shown in FIG. 3, in accordance with some embodiments of the present disclosure. Referring to FIG. 4, the liquid 110 is disposed in the recess 123, but does not completely fill the recess 123. A surface tension of the liquid 110 applies a force F to the conductive layer 124, resulting in a variation $\Delta R$ in length of the conductive layer 124 because of the attachment of the one end of the conductive layer 124 to the fixer 121. Since the length is related to the resistance, when the length is changed, the resistance of the conductive layer 124 is changed. An operator may use two probes to respectively contact the two pads 130 and 132 so as to measure the resistance of the conductive layer 124, thereby acquiring a variation in the resistance. The variation in the resistance is correlated with a surface tension of the liquid in the recess. Different types of liquid have different surface tensions, and therefore correspond to different resistances. Based on the measured resistance, the operator can identify the type of the liquid 110 in the semiconductor device 12. As a result, the semiconductor device 12 facilitates identifying the type of the liquid in the semiconductor device 12. There is no need to taste, smell or touch the liquid. Such actions might be harmful to human health.

Figure 5:
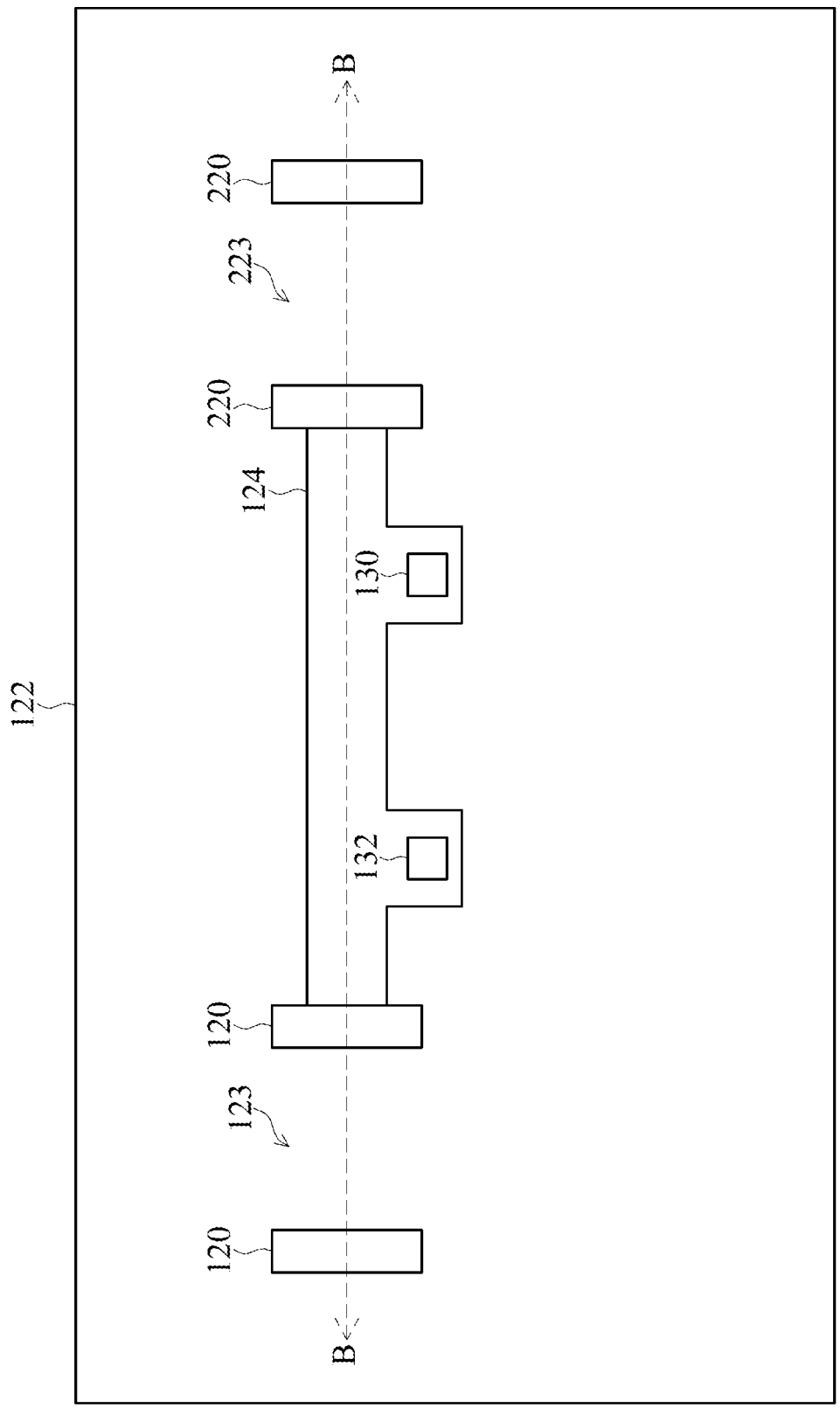
FIG. 5 is a top view of another semiconductor device, in accordance with some embodiments of the present disclosure.

FIG. 5 is a top view of another semiconductor device 22, in accordance with some embodiments of the present disclosure. Referring to FIG. 5, the semiconductor device 22 is similar to the semiconductor device 12 described and illustrated with reference to FIG. 2 except that the semiconductor device 22 includes two pairs of walls 120. The two pairs of walls 120 are disposed at opposite sides of the conductive layer 124. For convenience of discussion, one of the two pairs of walls 120 are renamed as a first pair of walls 120, and the other of the two pairs of walls 120 are renamed as a second pair of walls 220. Similarly, the recess 123 is renamed as a first recess 123, and the liquid 110 is renamed as a first liquid 110. A recess of the second pair of walls 220 is named a second recess 223.

Figure 6:
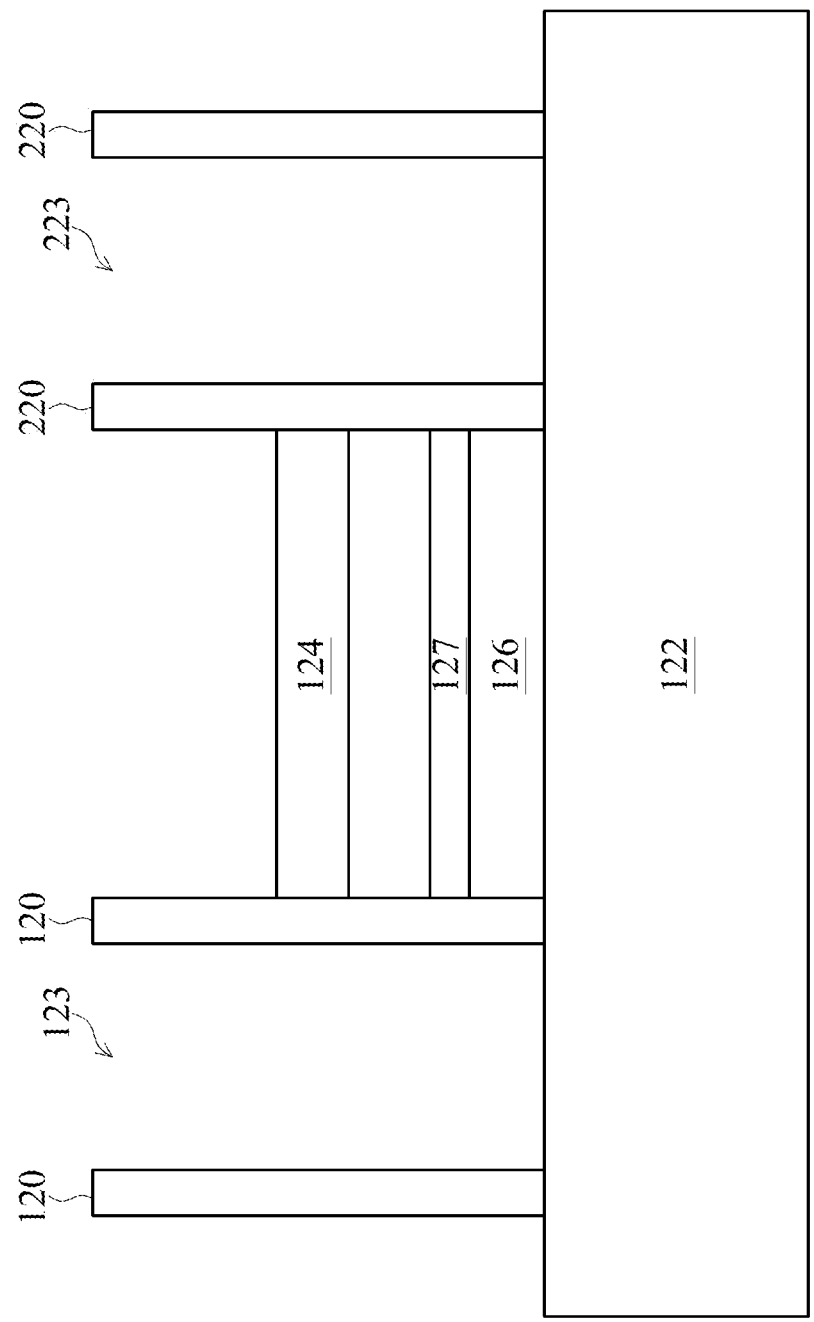
FIG. 6 is a cross-sectional diagram of the semiconductor device shown in FIG. 5 taken along a line B-B, in accordance with some embodiments of the present disclosure.

FIG. 6 is a cross-sectional diagram of the semiconductor device 22 shown in FIG. 5 taken along a line B-B, in accordance with some embodiments of the present disclosure. Referring to FIG. 6, one end of the conductive layer 124 is attached to one of the first pair of walls 120, and the other end of the conductive layer 124 is attached to one of the second pair of walls 220.

Figure 7:
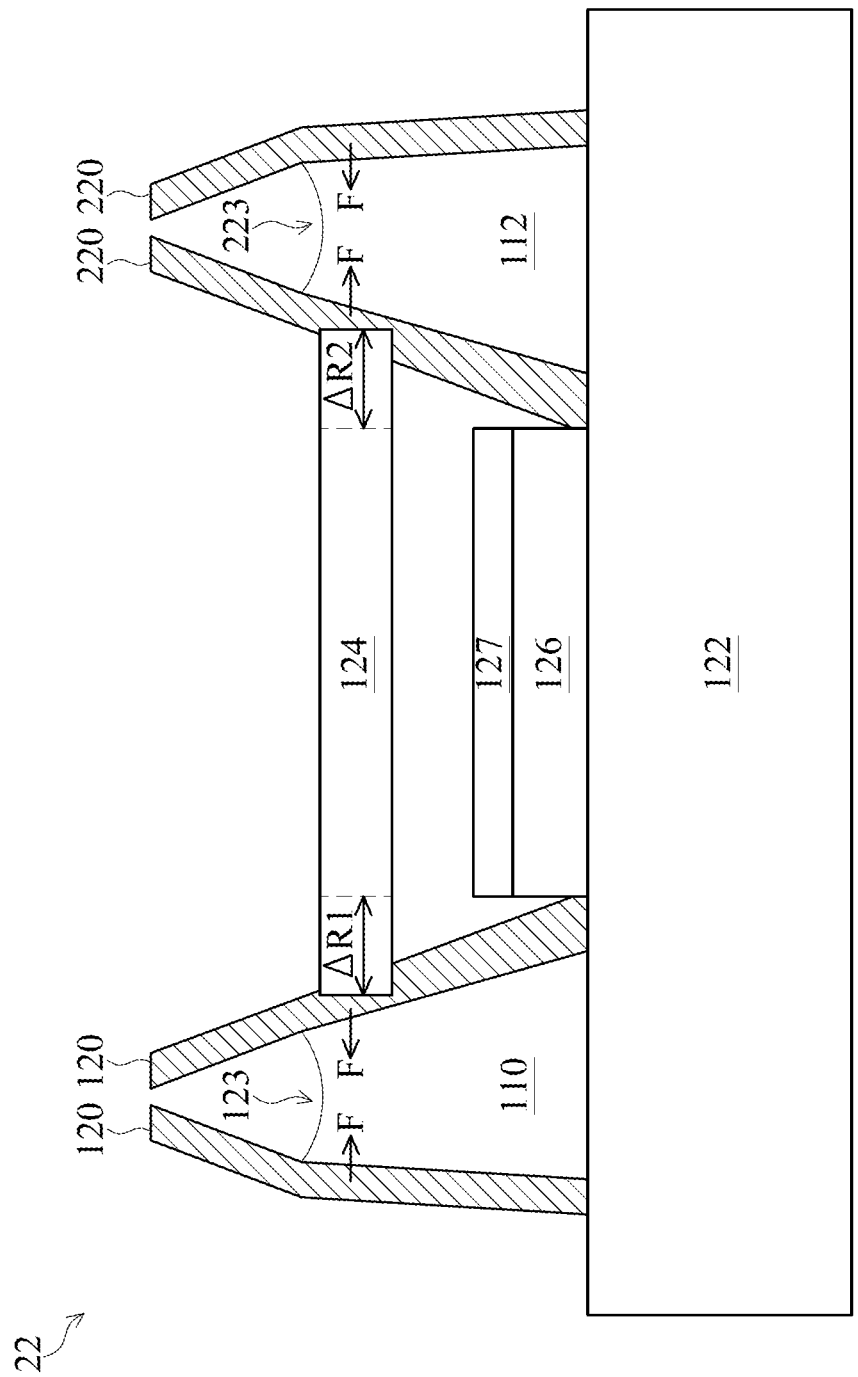
FIG. 7 is a schematic diagram illustrating a test performed by the semiconductor device shown in FIG. 6, in accordance with some embodiments of the present disclosure.

FIG. 7 is a schematic diagram illustrating a test performed by the semiconductor device 22 shown in FIG. 6, in accordance with some embodiments of the present disclosure. A liquid filled in the second recess 223 is named as a second liquid 112. A type of the second liquid 112 is the same as a type of the first liquid 110. Referring to FIG. 7, a surface tension of the first liquid 110 causes a first variation $\Delta R1$ in a length of the conductive layer 124, and a surface tension of the second liquid 112 causes a second variation $\Delta R2$ in the length of the conductive layer 124. In some embodiments, the first variation $\Delta R1$ equals the second variation $\Delta R2$. In some embodiments, the first variation $\Delta R1$ substantially equals to the second variation $\Delta R2$.

Because the conductive layer 124 is pulled in two opposite directions by the two pairs of walls 120 and 220, the deformation of the conductive layer 124 is relatively symmetric. The measured resistance is relatively accurate. As a result, accuracy in identifying the type of the liquid 110 is relatively high.

Figure 8:
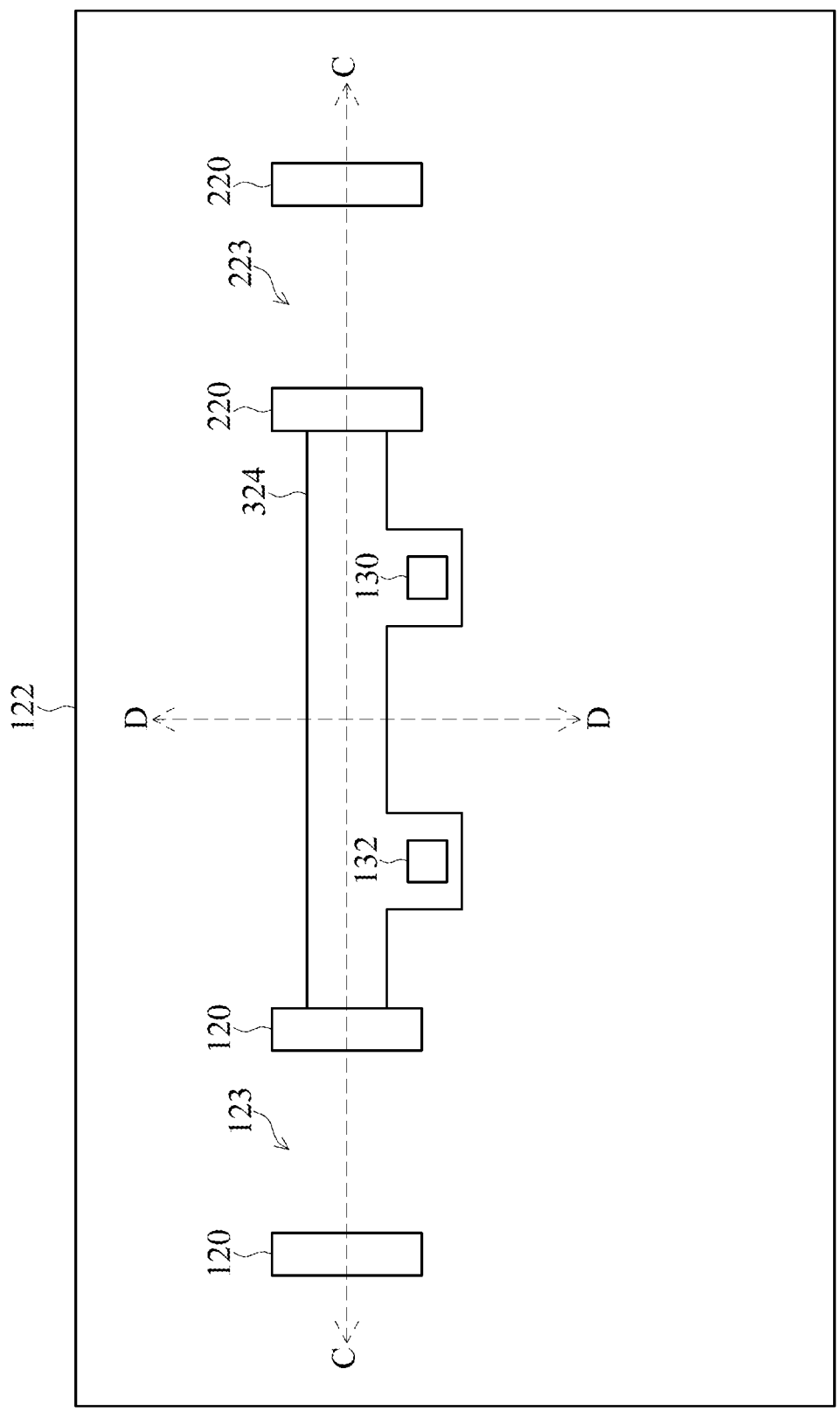
FIG. 8 is a top view of yet another semiconductor device, in accordance with some embodiments of the present disclosure.
Figure 9:
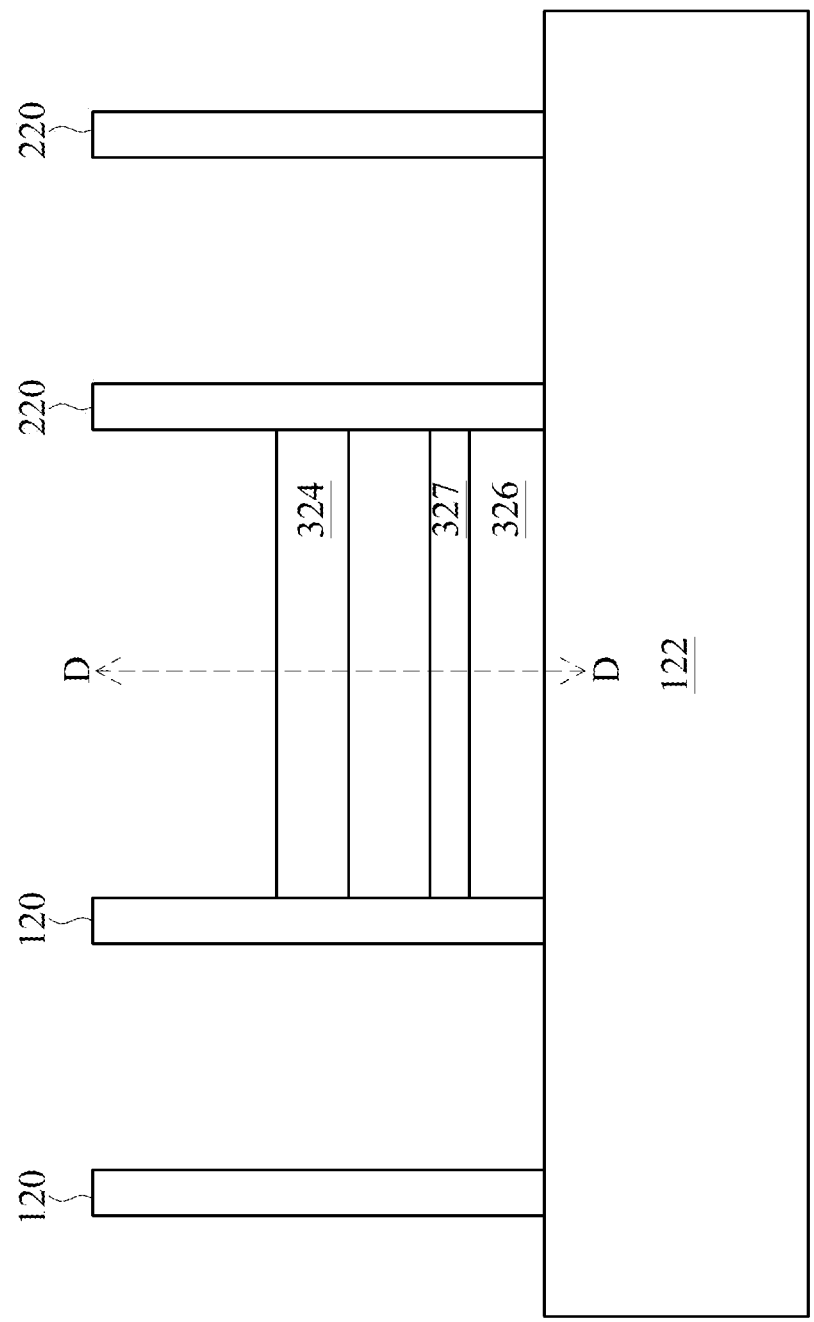
FIG. 9 is a cross-sectional view of the semiconductor device shown in FIG. 8, in accordance with some embodiments of the present disclosure.

FIG. 8 is a top view of yet another semiconductor device 32, in accordance with some embodiments of the present disclosure. FIG. 9 is a cross-sectional view of the semiconductor device 32 shown in FIG. 8, in accordance with some embodiments of the present disclosure. Referring to FIGS. 8 and 9, the semiconductor device 32 is similar to the semiconductor device 22 described and illustrated with reference to FIG. 5 except that, for example, the semiconductor device 32 includes a conductive layer 324. In addition, location of a pad 132 and location of a pad 130 are substantially symmetrical with respect to a center line A-A of the conductive layer 324.

Due to the symmetrical configuration, a resistance variation in a conductive path from the pad 132 to a position of the conductive layer 324 in line with the center line A-A equals a resistance variation in a conductive path from the pad 130 to the position of the conductive layer 324 in line with the center line A-A. The measured resistance is relatively accurate. As a result, accuracy in identifying the type of the liquid 110 is relatively high.

Figure 10:
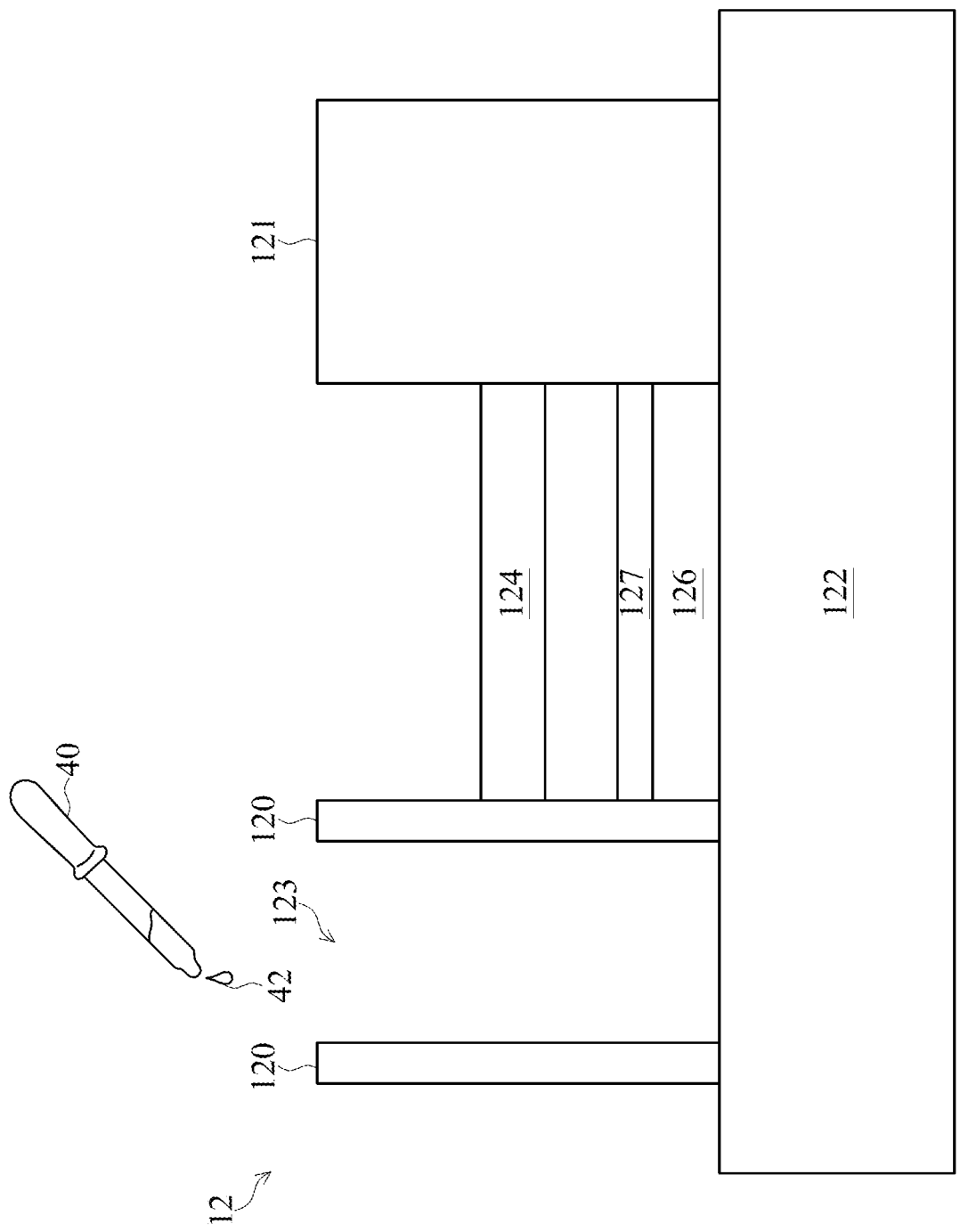
FIGS. 10 to 12 are cross-sectional views of intermediate steps of sensing a change in a level of a liquid contained in a semiconductor device shown in FIG. 3, in accordance with some embodiments of the present disclosure.
Figure 11:
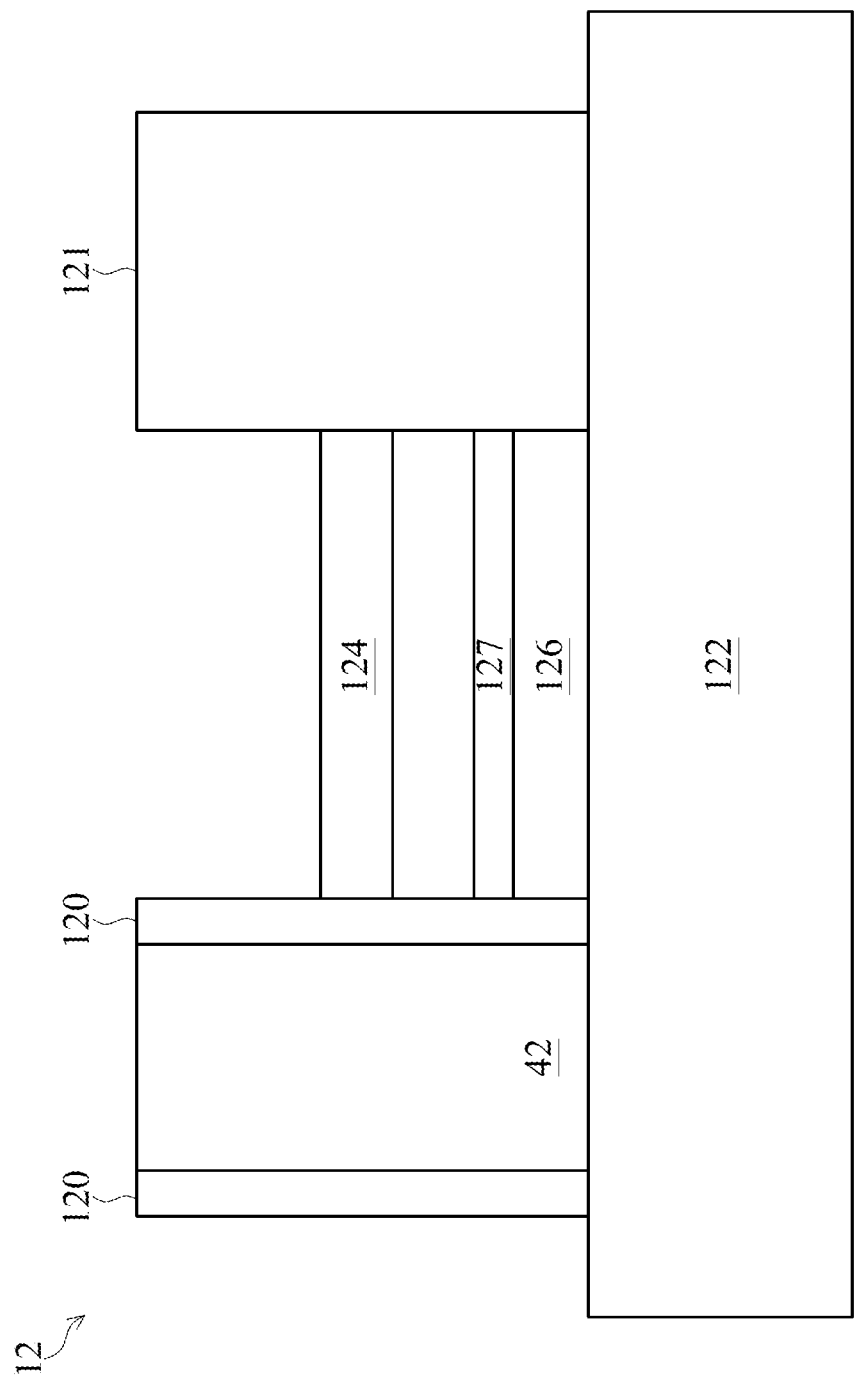
Figure 12:
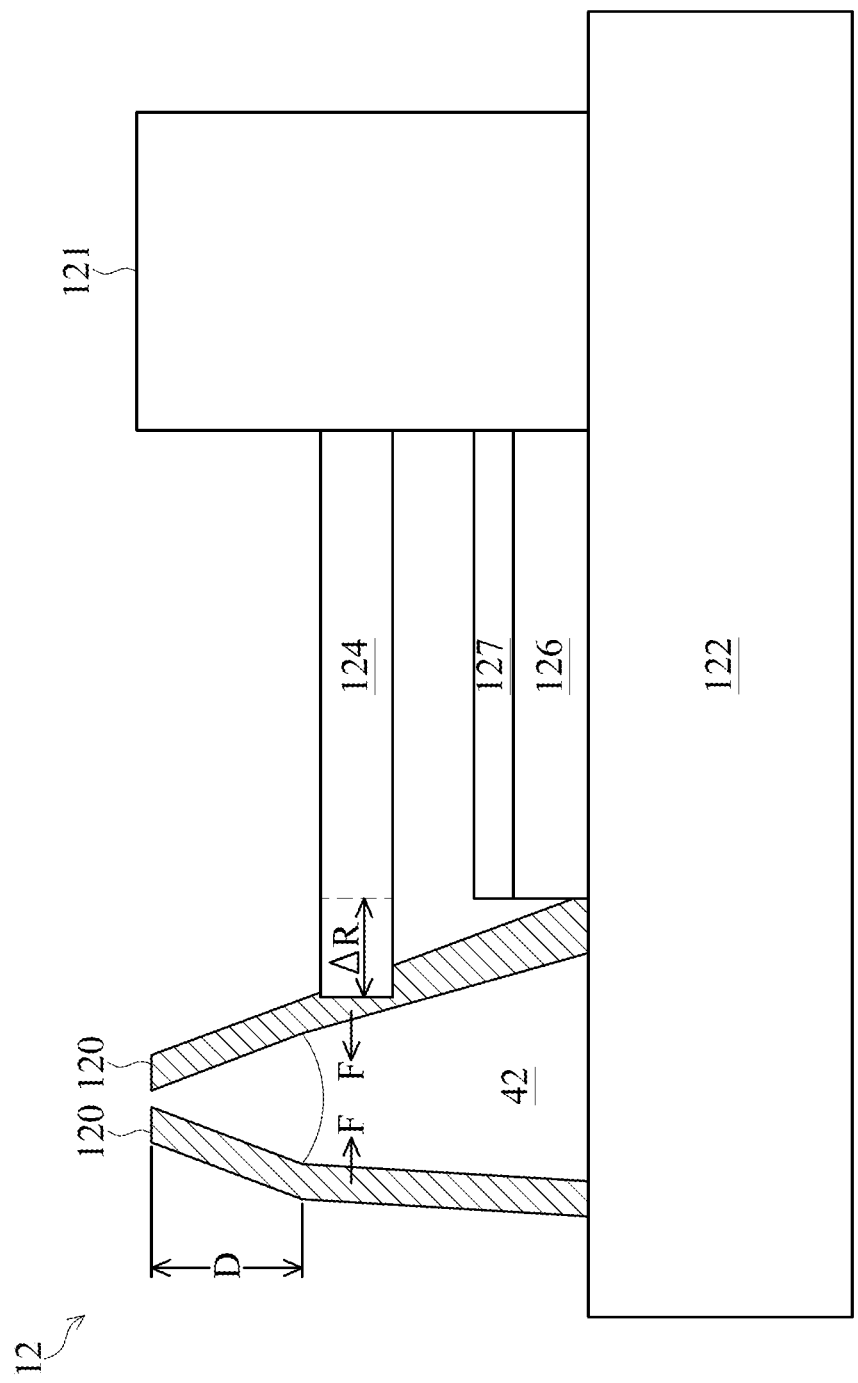

FIGS. 10 to 12 are cross-sectional views of intermediate steps of sensing a change in a level of a liquid contained in the semiconductor device 12 shown in FIG. 2, in accordance with some embodiments of the present disclosure. Referring to FIG. 10, a liquid 42 is applied into a recess 123 between a pair of walls 120 by, for example, a dropper 40. Referring to FIG. 11, the liquid 42 is applied to completely fill the recess 123. A surface of the liquid 42 is level with a surface of the pair of walls 120. At such time, no surface tension exists. Accordingly, the conductive layer 124 is not deformed. A resistance of the conductive layer 124 is continually measured. After time elapses, referring to FIG. 12, a depth of the liquid 42 is decreased by a height D. A level of the liquid 42 is changed. Accordingly, a surface tension occurs, and the conductive layer 124 is deformed in response to the surface tension of the liquid 42. An operator can determine that the level of the liquid 42 is decreased based on the variation in the resistance of the conductive layer 124. As a result, the operator can easily determine that a level of the liquid contained in the semiconductor device 12 is decreased.

Figure 13:
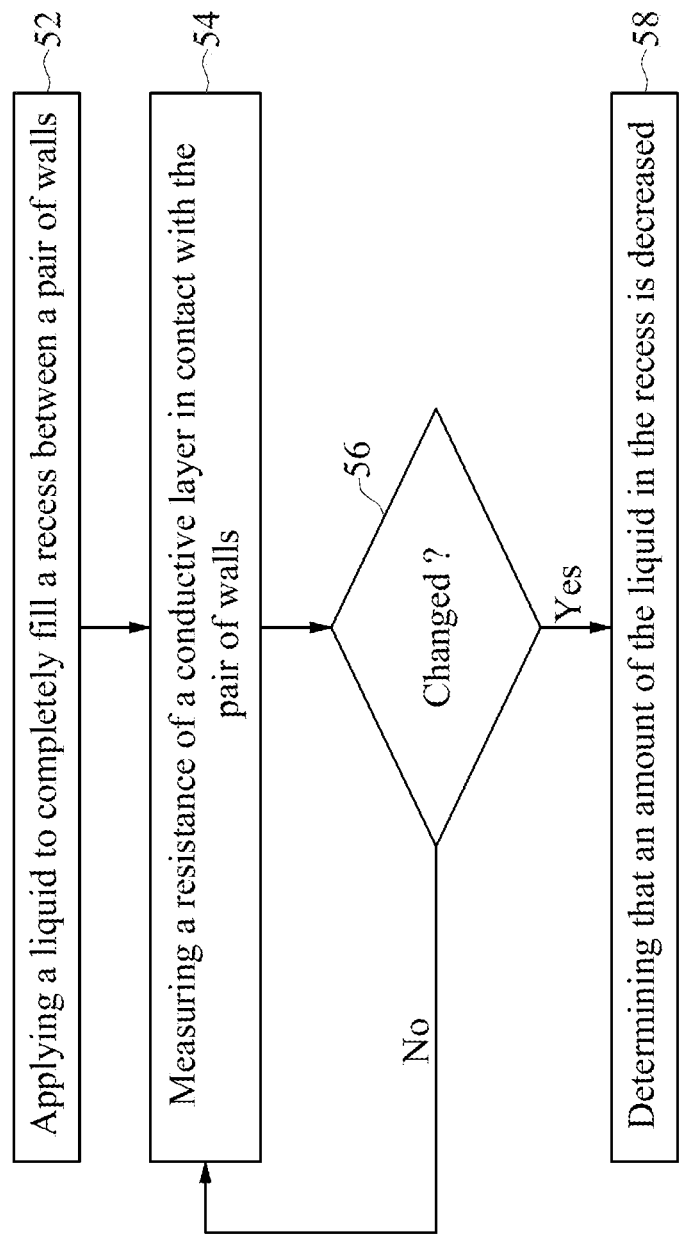
FIG. 13 is a flowchart of a method of sensing a change in a level of a liquid contained in a semiconductor device, in accordance with some embodiments of the present disclosure.

FIG. 13 is a flowchart of a method 50 of sensing a decrease in a level of a liquid contained in a semiconductor device, in accordance with some embodiments of the present disclosure. Referring to FIG. 13, the method 50 includes operations 52, 54, 56 and 58.

The method 50 begins with operation 52, in which a liquid is applied to completely fill a recess between a pair of walls.

The method 50 continues with operation 54, in which a resistance of a conductive layer in contact with the pair of walls is measured.

The method 50 proceeds to operation 56, in which it is determined whether the measured resistance is changed. If negative, the method 50 returns to operation 54. If affirmative, the method 50 proceeds to operation 56. In operation 56, it is determined that an amount of the liquid in the recess is decreased.

The method 50 is merely an example, and is not intended to limit the present disclosure beyond what is explicitly recited in the claims. Additional operations can be provided before, during, and after the method 50, and some operations described can be replaced, eliminated, or moved around for additional embodiments of the method.

Figure 14:
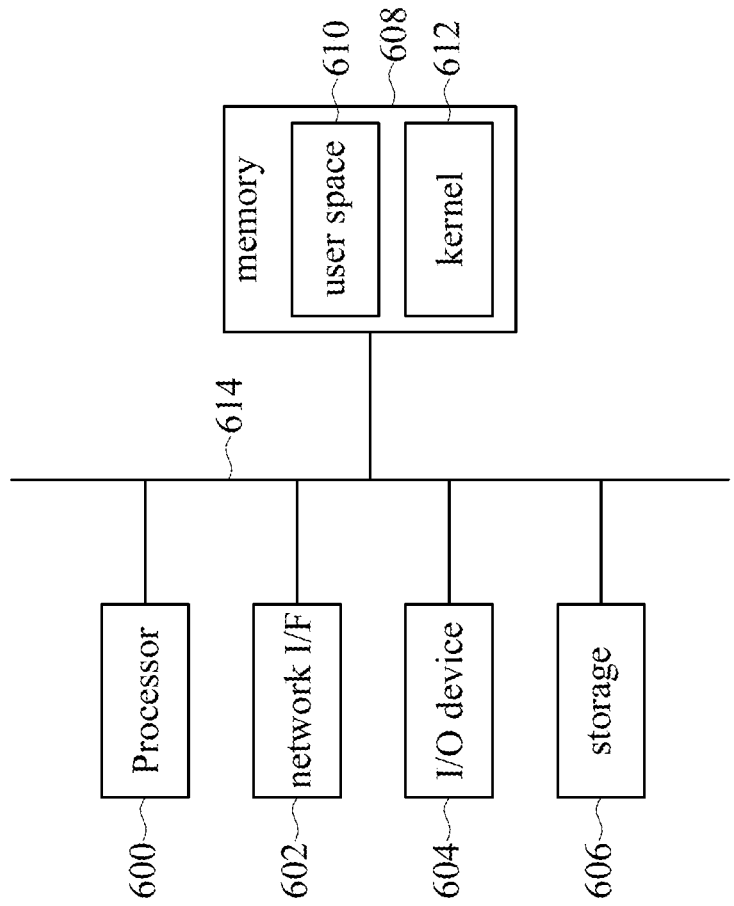
FIG. 14 is a block diagram of the system shown in FIG. 1, in accordance with some embodiments of the present disclosure.

FIG. 14 is a block diagram of the system 14 shown in FIG. 1, in accordance with some embodiments of the present disclosure. One or more of the tools, systems, or operations described with respect to FIGS. 1 to 13 are realized in some embodiments by one or more systems 14 of FIG. 14. The system 14 comprises a processor 600, a memory 608, a network interface (I/F) 602, a storage 606, and an input/output (I/O) device 604 communicatively coupled via a bus 614 or other interconnection communication mechanism.

The memory 608 comprises, in some embodiments, a random access memory (RAM), other dynamic storage device, read-only memory (ROM), or other static storage device, coupled to the bus 614 for storing data or instructions to be executed by the processor 600, e.g., kernel 612, user space 610, portions of the kernel or the user space, and components thereof. The memory 608 is also used, in some embodiments, for storing temporary variables or other intermediate information during execution of instructions by the processor 600.

In some embodiments, a storage device 606, such as a magnetic disk or an optical disk, is coupled to the bus 614 for storing data or instructions, e.g., kernel 612, user space 610, etc. The I/O device 604 comprises an input device, an output device, or a combined input/output device for enabling user interaction with the system 14. An input device comprises, for example, a keyboard, keypad, mouse, trackball, trackpad, or cursor direction keys for communicating information and commands to the processor 600. An output device comprises, for example, a display, a printer, a voice synthesizer, etc. for communicating information to a user.

In some embodiments, one or more operations or functionality of the tools or systems described with respect to FIGS. 1 to 13 are realized by the processor 600, which is programmed for performing such operations and functions. One or more of the memory 608, the I/F 602, the storage 606, the I/O device 604 and the bus 614 are operable to receive instructions, data, design rules, netlists, layouts, models and other parameters for processing by the processor 600.

In some embodiments, one or more of the operations, functionality of the tools, and systems described with respect to FIGS. 1 to 13 are implemented by specifically configured hardware (e.g., by one or more application specific integrated circuits (ASICs), which are included) separate from or in lieu of the processor 600. Some embodiments incorporate more than one of the described operations or functions in a single ASIC.

In some embodiments, the operations and functions are realized as functions of a program stored in a non-transitory computer readable recording medium. Examples of a non-transitory computer readable recording medium include, but are not limited to, external/removable or internal/built-in storage or memory unit, e.g., one or more of an optical disk, such as a DVD, a magnetic disk, such as a hard disk, a semiconductor memory, such as a ROM, a RAM, a memory card, and the like.

FIGS. 15 to 24 are cross-sectional diagrams of intermediate steps of manufacturing a semiconductor device, in accordance with some embodiments of the present disclosure. It should be understood that FIG. 15 to FIG. 24 have been simplified to better facilitate a clear understanding of various embodiments of the present disclosure.

Figure 15:
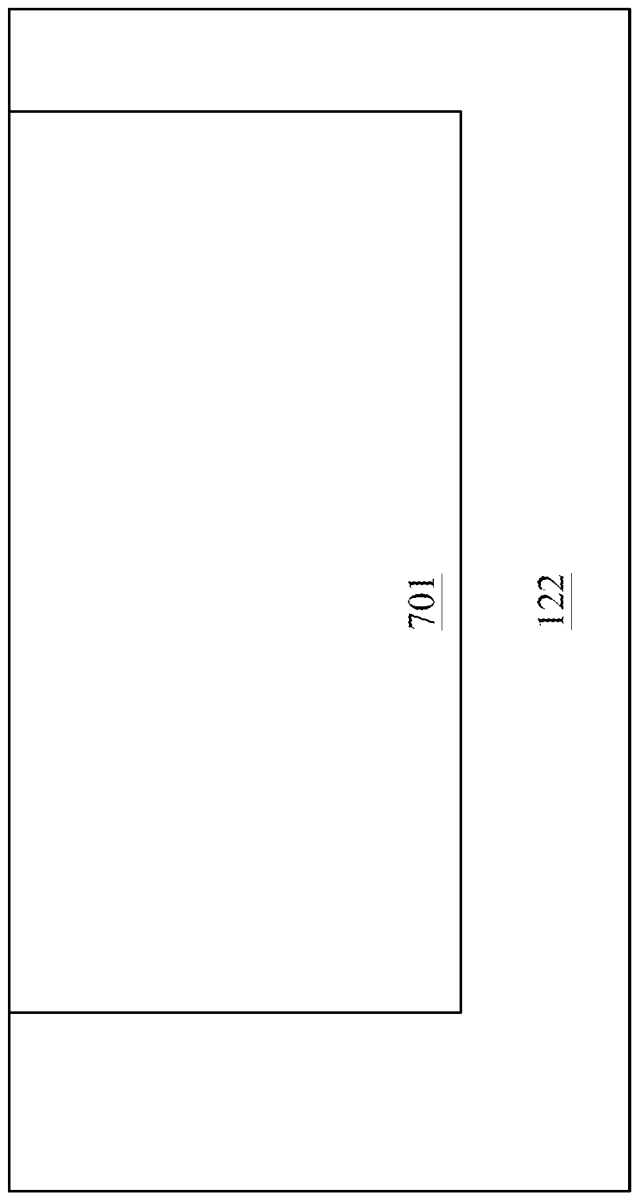
FIGS. 15 to 24 are cross-sectional diagrams of intermediate steps of manufacturing a semiconductor device, in accordance with some embodiments of the present disclosure.

Referring to FIG. 15, a substrate 122 is received. In some embodiments, the substrate 122 may be a p-type doped substrate, or an n-type doped substrate, which means that the semiconductor substrate 122 may be doped with either n-type or p-type impurities. A p-type material may be further classified as a p++, p+, p, p−, or p−− type material, depending on the concentration of the dopant. If a material is stated to be a p-type material, it is doped with p-type impurities and it may be any of the p++, p+, p, p−, or p−− type materials. Similarly, an n-type material may be further classified as an n++, n+, n, n−, or n−− type material. If a material is stated to be an n-type material, it is doped with n-type impurities and it may be any of the n++, n+, n, n−, or n−− type materials. Dopant atoms for p-type materials include boron, for example. With n-type materials, dopant atoms include phosphorous, arsenic, and antimony, for example. Doping may be done through ion implantation processes. In some embodiments, the substrate 122 is formed from silicon, gallium arsenide, silicon germanium, silicon carbon, or other known semiconductor materials used in semiconductor device processing.

Additionally, a recess is formed in the substrate 122 by, for example, performing an etching process on the substrate 122 to remove a portion of the substrate 122. An oxide structure 701 is formed in the recess in the substrate 122.

Figure 16:
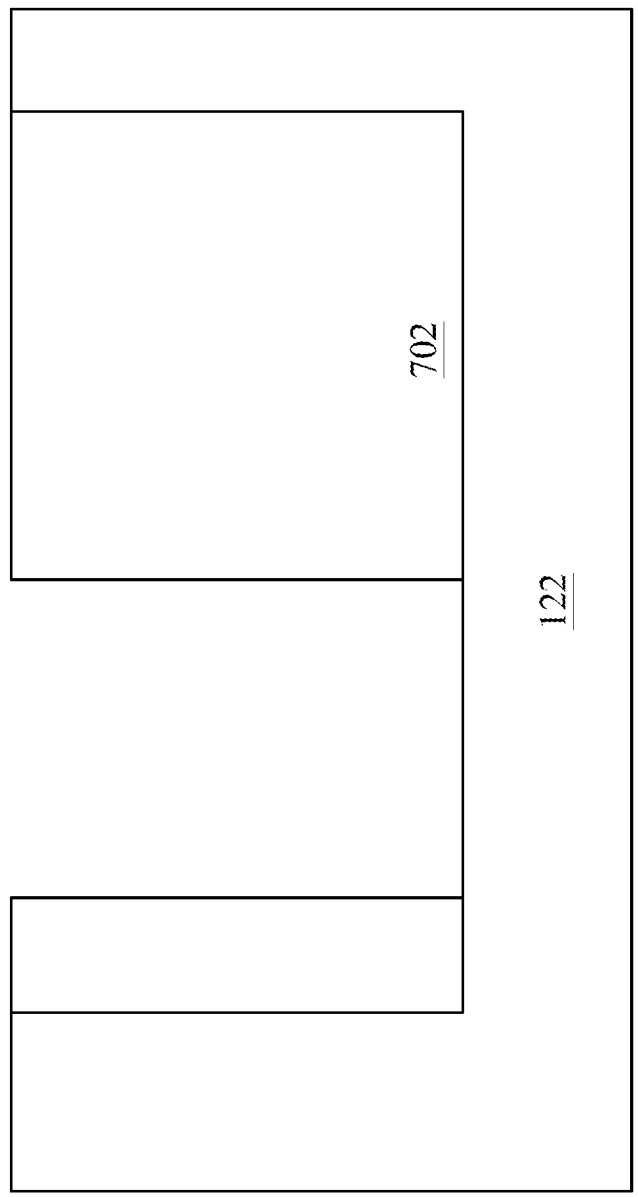

Referring to FIG. 16, a patterned oxide structure 702 is formed by, for example, performing an etching process on the oxide structure 701 to remove a portion of the oxide structure 701.

Figure 17:
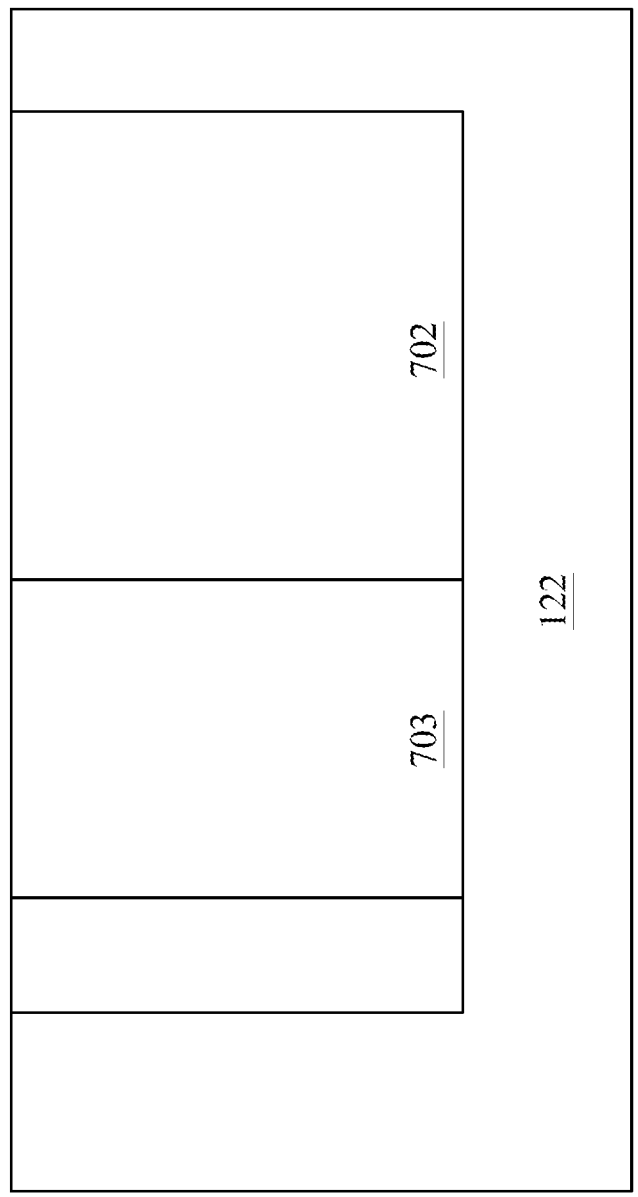

Referring to FIG. 17, a semiconductor material 703 is completely deposited in the patterned oxide structure 702.

Figure 18:
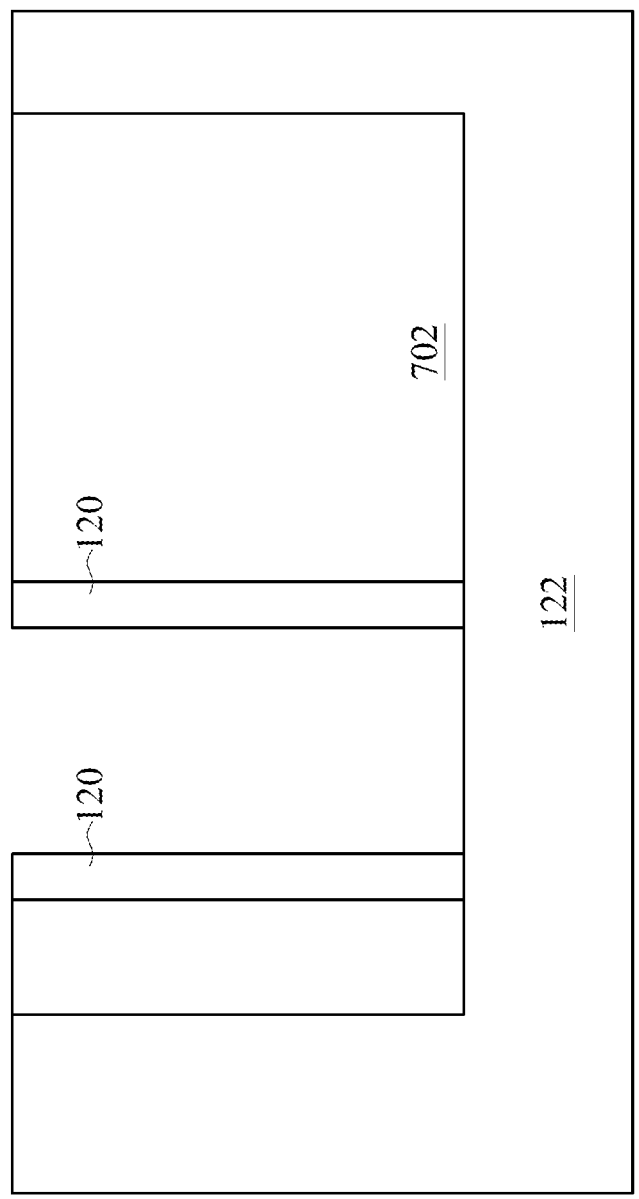

Referring to FIG. 18, a pair of walls 120 are formed by, for example, performing an etching process on the semiconductor material 703.

Figure 19:
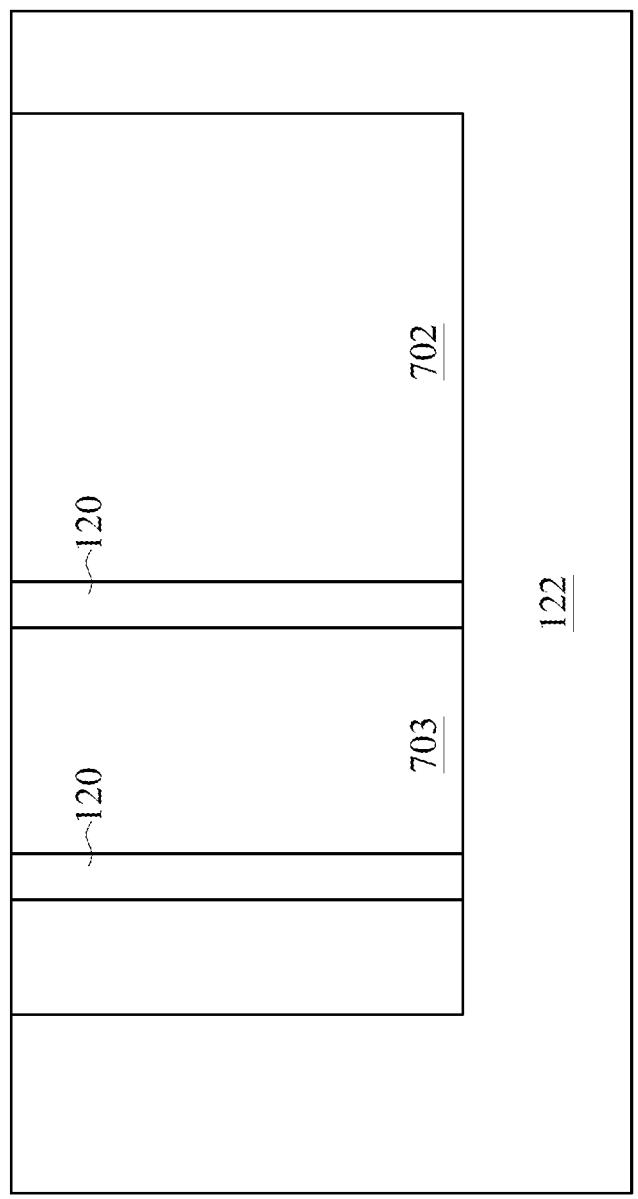

Referring to FIG. 19, a semiconductor material 703 is completely deposited into the recess between the pair of walls 120 by, for example, a deposition process.

Figure 20:
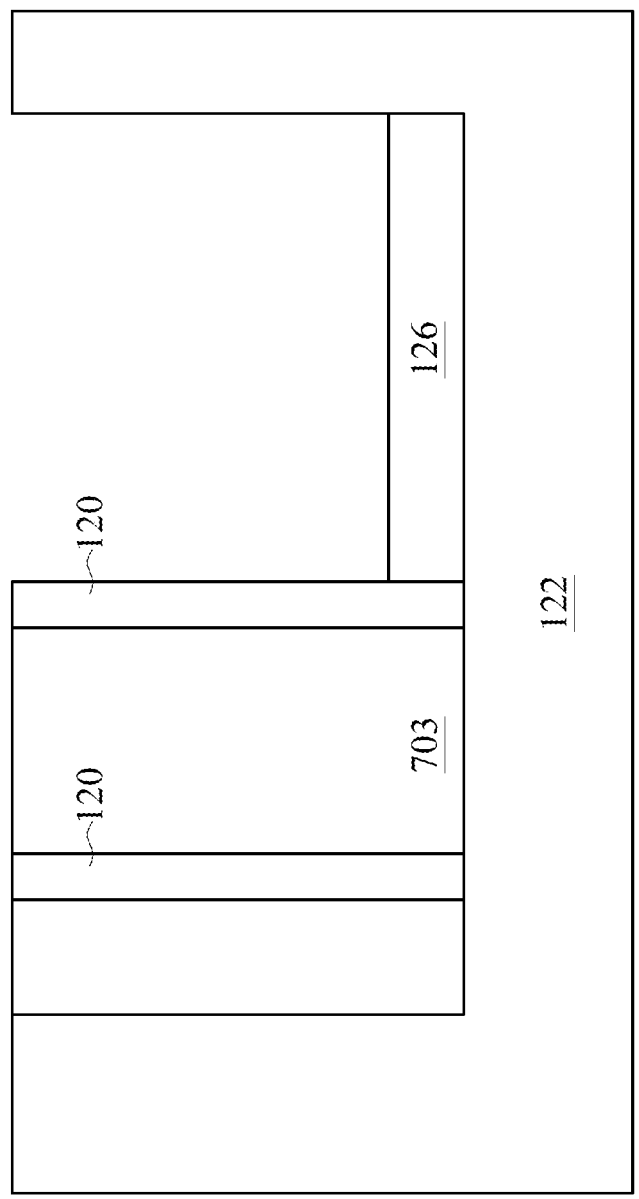

Referring to FIG. 20, an insulation layer 126 is formed by performing an etching process on the patterned oxide structure 702. The insulation layer 126 is completely formed on a surface of the substrate 122.

Figure 21:
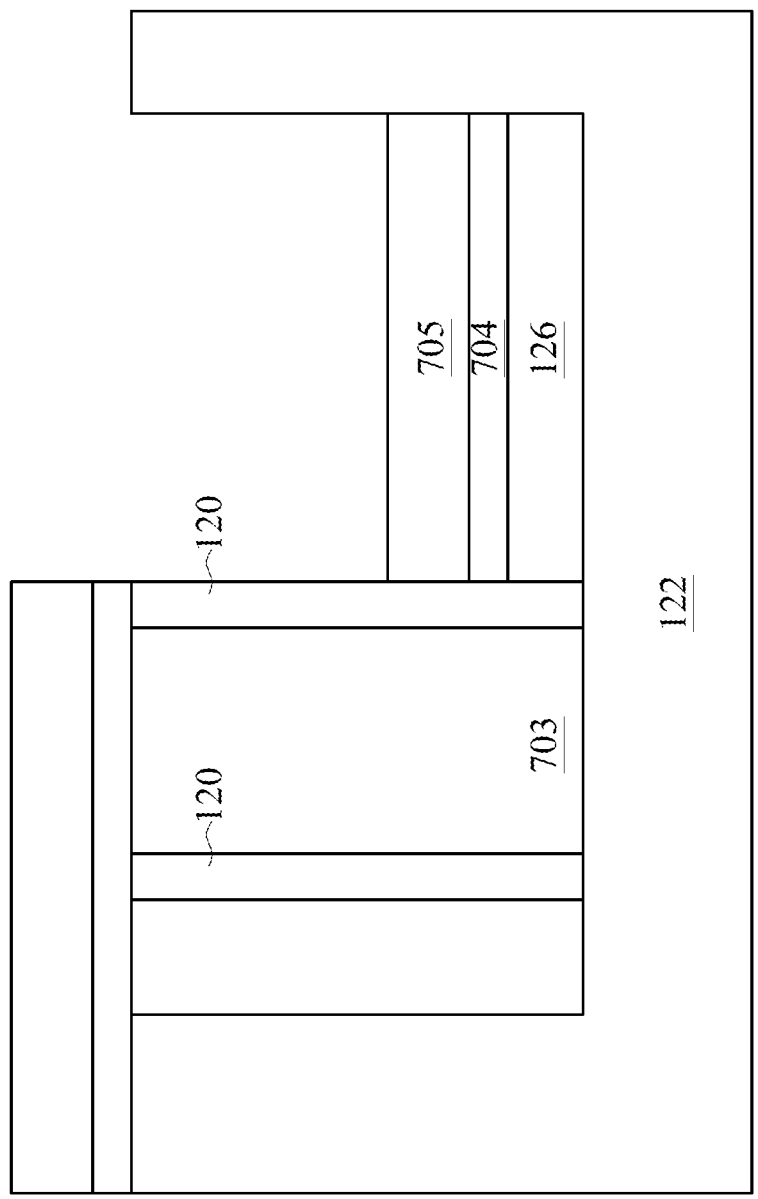

Referring to FIG. 21, a SiN layer 704 is formed on the insulation layer 126 and the pair of walls 120 by, for example, any suitable method, such as spinning, chemical vapor deposition (CVD), or plasma-enhanced CVD (PECVD). Next, an oxide layer 705 is formed on the SiN layer 704 by, for example, any suitable method, such as spinning, CVD, or PECVD.

Figure 22:
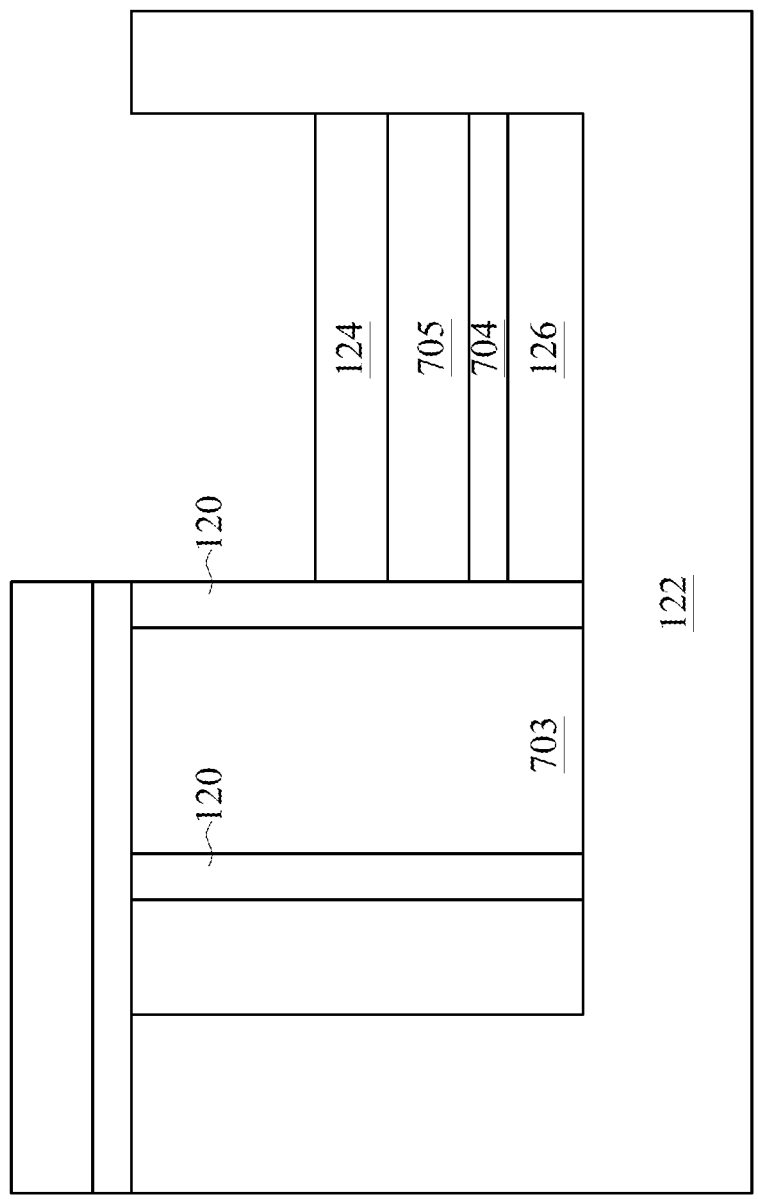

Referring to FIG. 22, a conductive layer 124 is formed on the oxide layer 705 by, for example, spinning, CVD, or plasma-enhanced PECVD. One end of the conductive layer 124 is attached to one of the pair of walls 120, and the other end of the conductive layer 124 is attached to an inner sidewall of the substrate 122.

Figure 23:
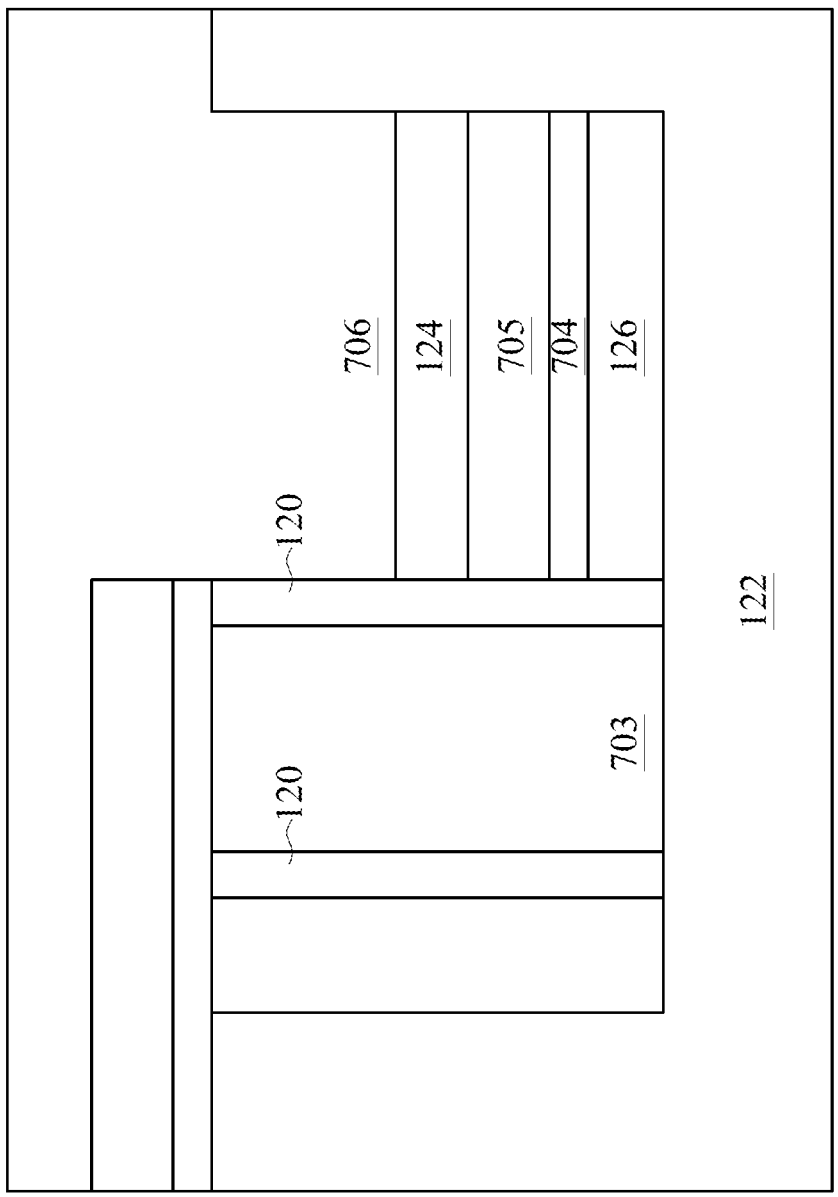

Referring to FIG. 23, an oxide layer 706 is formed on the oxide layer 705 and the conductive layer 124.

Figure 24:
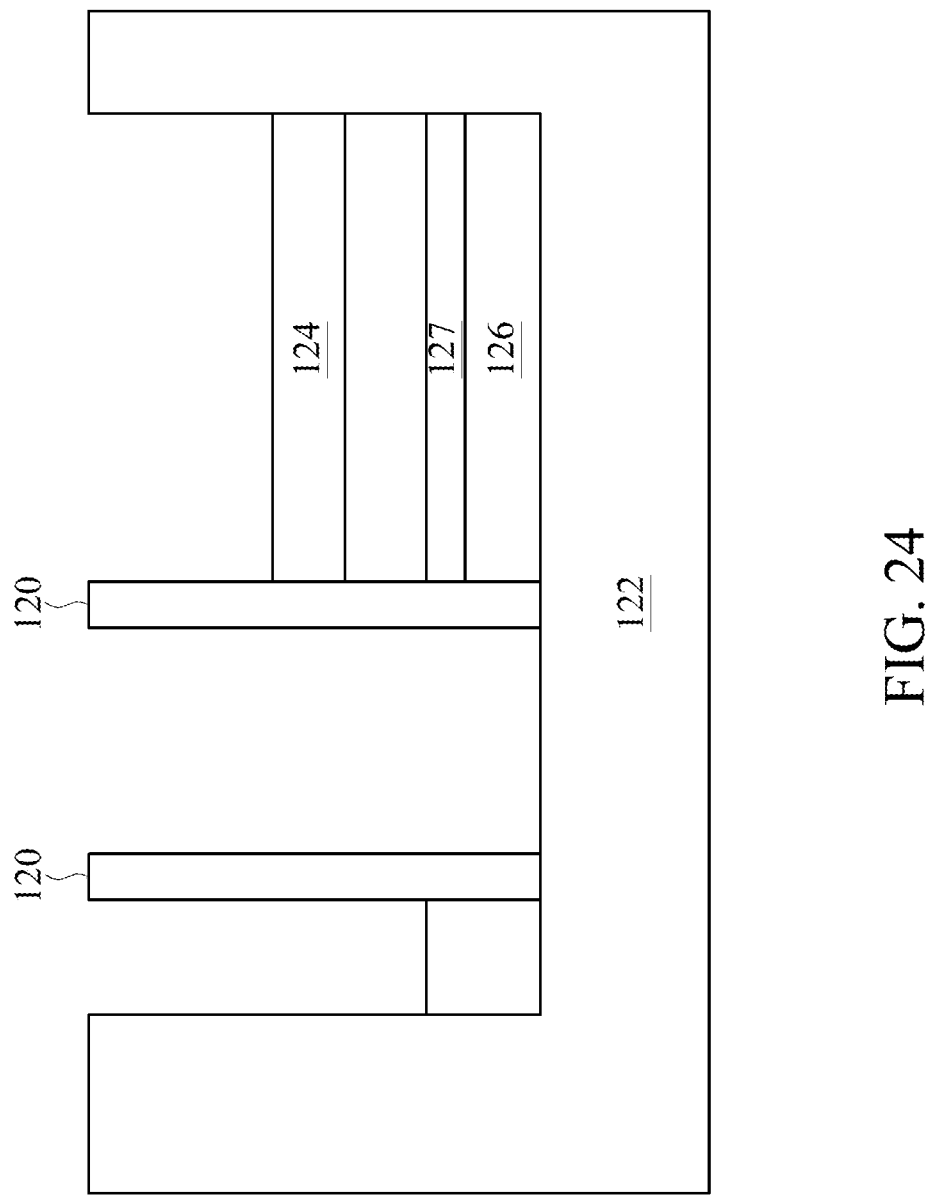

Referring to FIG. 24, the conductive layer 124 is exposed and suspended between the pair of walls 120 and the inner sidewall of the substrate 122 by removing the oxide layer 705 beneath the conductive layer 124. Moreover, the semiconductor material 703 is removed, resulting in a semiconductor device similar to the semiconductor device 12 described and illustrated with reference to FIG. 2.

Figure 25:
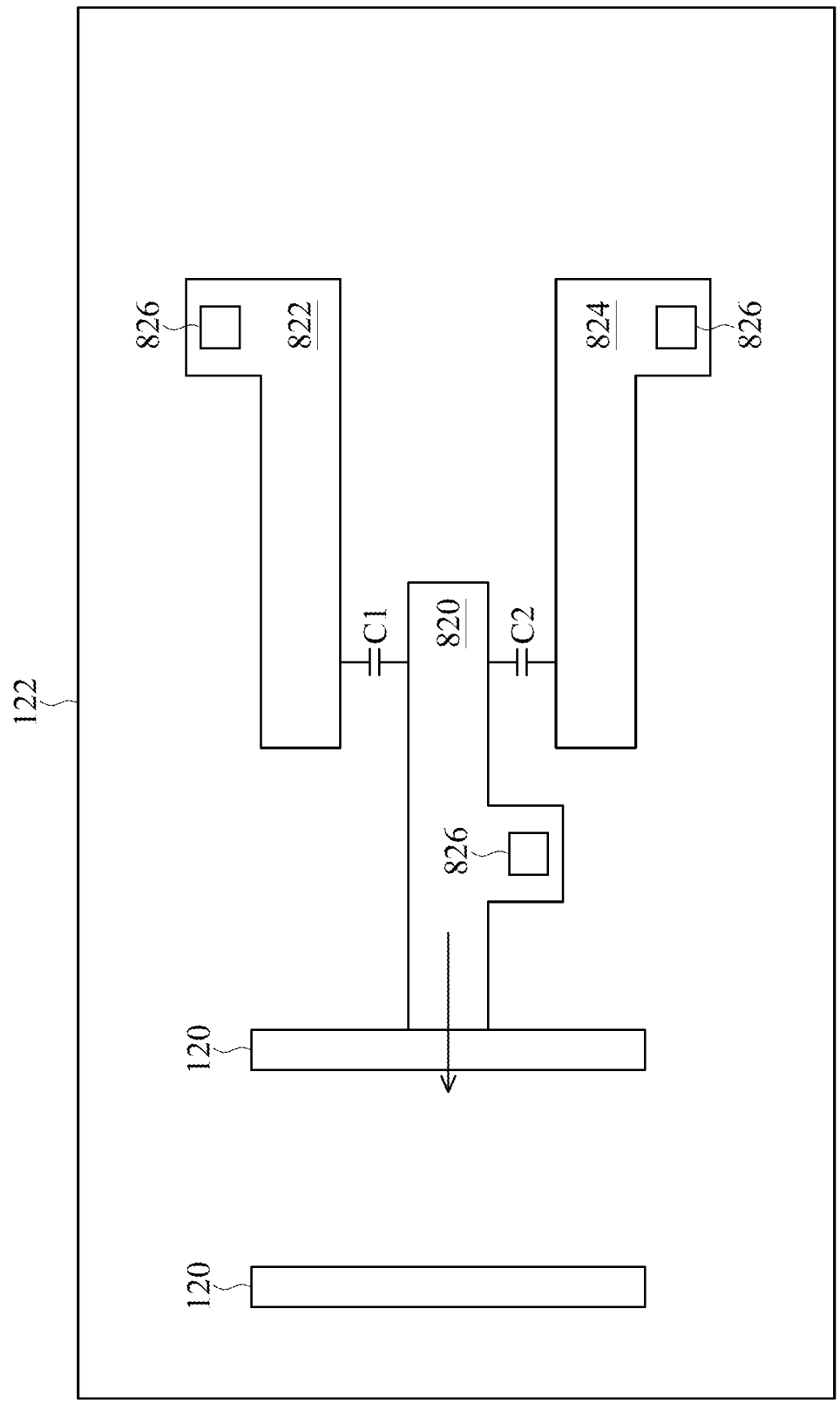
FIG. 25 is a top view of yet another semiconductor device, in accordance with some embodiments of the present disclosure.

FIG. 25 is a top view of yet another semiconductor device 82, in accordance with some embodiments of the present disclosure. Referring to FIG. 25, the semiconductor device 82 is similar to the semiconductor device 12 described and illustrated with reference to FIG. 2 except that, for example, the semiconductor device 82 includes conductive layers 820, 822 and 824, which are electrically isolated from one another.

The conductive layers 820 and 822 define a capacitance C1 therebetween. Once the conductive layer 820 is moved in a direction (depicted in FIG. 25 by an arrow) in response to a surface tension of a liquid, a projection area of the conductive layer 822 on the conductive layer 820 is changed, resulting in a variation in the capacitance C1.

The conductive layers 820 and 824 define a capacitance C2 therebetween. When the conductive layer 820 is moved in the direction in response to a surface tension of a liquid, a projection area of the conductive layer 824 on the conductive layer 820 is changed, resulting in a variation in the capacitance C2.

An operator can measure variations in the capacitances C1 and C2 by using a probe to contact pads 826 on each of the conductive layers 822, 824 and 826. According to the variations in the capacitances C1 and C2, the operator is able to identify the type of the liquid in the semiconductor device 82 in the same manner as described in the embodiment of FIG. 2.

Figure 26:
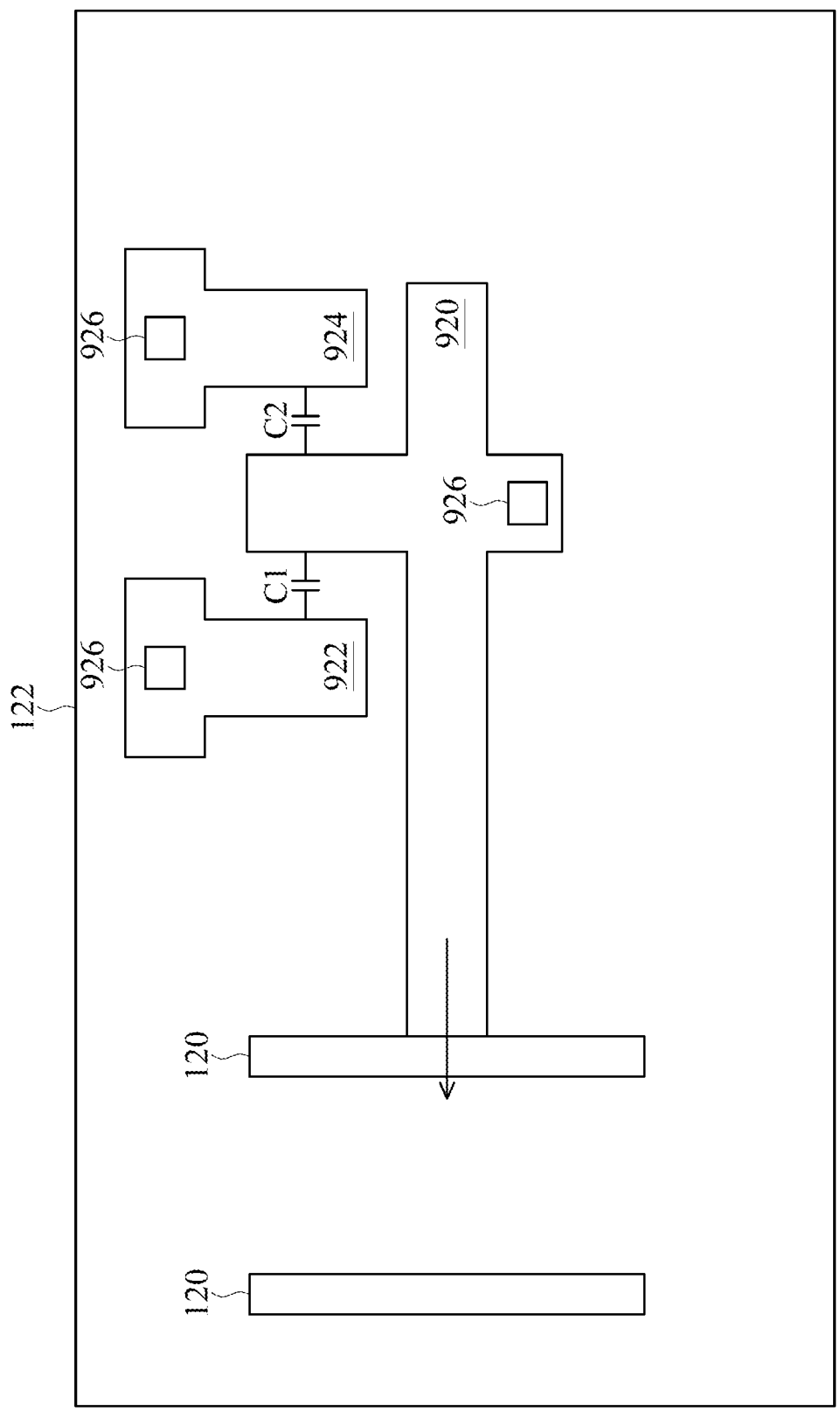
FIG. 26 is a top view of still another semiconductor device, in accordance with some embodiments of the present disclosure.

FIG. 26 is a top view of still another semiconductor device 92, in accordance with some embodiments of the present disclosure. Referring to FIG. 26, the semiconductor device 92 is similar to the semiconductor device 82 described and illustrated with reference to FIG. 25 except that, for example, the semiconductor device 92 includes conductive layers 920, 922 and 924, which are electrically isolated from one another.

The conductive layers 920 and 922 define a capacitance C1 therebetween. When the conductive layer 920 is moved in a direction (as depicted in FIG. 26 by an arrow) in response to a surface tension of a liquid, a distance between the conductive layers 920 and 922 is changed, resulting in a variation in the capacitance C1.

The conductive layers 920 and 924 define a capacitance C2 therebetween. When the conductive layer 920 is moved in the direction in response to a surface tension of a liquid, a distance between the conductive layers 920 and 924 is changed, resulting in a variation in the capacitance C2.

An operator can measure variations in the capacitances C1 and C2 by using a probe to contact pads 926 on each of the conductive layers 922, 924 and 926. According to the variations in the capacitances C1 and C2, the operator is able to identify the type of the liquid in the semiconductor device 92 in the same manner as described in the embodiment of FIG. 2.

In the present disclosure, the semiconductor device 12 facilitates identifying the type of the liquid in the semiconductor device 12. There is no need to taste, smell or touch the liquid. Such actions might be harmful to human health.

One embodiment of the present disclosure provides a semiconductor device. The semiconductor device includes a substrate, a pair of walls and a conductive layer. The pair of walls, disposed on the substrate, are configured to define a recess therebetween to receive a liquid. The conductive layer is disposed above the substrate, and has a resistance, wherein a variation in the resistance is correlated with a surface tension of the liquid in the recess.

Another aspect of the present disclosure provides a semiconductor device. The semiconductor device includes a substrate, a pair of walls and a conductive layer. The pair of walls, disposed on the substrate, are configured to define a recess therebetween to receive a liquid. The conductive layer is disposed above the substrate, and is deformable by the pair of walls in response to a surface tension of the liquid.

Another aspect of the present disclosure provides a method of sensing a change in a level of a liquid contained in a semiconductor device. The semiconductor device includes a substrate, a pair of walls disposed on the substrate and configured to define a recess therebetween, and a conductive layer disposed above the substrate. The method includes applying a liquid to completely fill the recess between the pair of walls; measuring a resistance of the conductive layer in contact with the pair of walls; and determining that an amount of the liquid is decreased when the measured resistance is changed.

The scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A semiconductor device, comprising:
a substrate;
a pair of walls, disposed on the substrate, configured to define a recess therebetween to receive a liquid;
a conductive layer, disposed above the substrate and having a resistance, wherein a variation in the resistance is correlated with a surface tension of the liquid in the recess;
an insulation layer disposed on the substrate;
a first pad disposed above the insulation layer; and
a second pad disposed above the insulation layer,
wherein the first pad and the second pad in combination serve as a medium for measuring the resistance of the conductive layer.

2. The semiconductor device of claim 1, wherein the conductive layer is in contact with the pair of walls.

3. The semiconductor device of claim 1, wherein the conductive layer and the insulation layer are in contact with the pair of walls.

4. A semiconductor device, comprising:
a substrate;
a pair of walls, disposed on the substrate, configured to define a recess therebetween to receive a liquid; and
a conductive layer, disposed above the substrate and having a resistance, wherein a variation in the resistance is correlated with a surface tension of the liquid in the recess;
wherein the pair of walls are a first pair of walls, the recess is a first recess, the liquid is a first liquid, and the semiconductor device further includes:
a second pair of walls, disposed on the substrate, configured to define a second recess therebetween to receive a second liquid, the type of the first liquid being the same as the type of the second liquid, wherein the variation in the resistance is correlated with both the surface tension of the first liquid in the first recess and a surface tension of the second liquid in the second recess,
wherein the first pair of walls and the second pair of walls are respectively disposed at opposite sides of the conductive layer.

5. The semiconductor device of claim 4, further comprising:
a first pad for measuring the resistance; and
a second pad for measuring the resistance,
wherein a location of the first pad and a location of the second pad are substantially symmetrical with respect to a center line of the conductive layer.

6. The semiconductor device of claim 5, further comprising:
an insulation layer disposed on the substrate, wherein the first pad and the second pad are disposed above the insulation layer.

7. A semiconductor device, comprising:
a substrate;

a pair of walls, disposed on the substrate, configured to define a recess therebetween to receive a liquid; and a conductive layer disposed above the substrate, and deformable by the pair of walls in response to a surface tension of the liquid.

8. The semiconductor device of claim 7, wherein the conductive layer is in contact with the pair of walls.

9. The semiconductor device of claim 7, further comprising:

an insulation layer disposed on the substrate.

10. The semiconductor device of claim 9, wherein the conductive layer and the insulation layer are in contact with the pair of walls.

11. The semiconductor device of claim 9, further comprising:

a first pad disposed above the insulation layer; and a second pad disposed above the insulation layer, wherein the first pad and the second pad in combination serve as a medium for measuring the resistance of the conductive layer.

12. The semiconductor device of claim 7, wherein the pair of walls are a first pair of walls, the recess is a first recess, the liquid is a first liquid, and the semiconductor device further includes:

a second pair of walls, disposed on the substrate, configured to define a second recess therebetween to receive a second liquid, a type of the first liquid being the same as a type of the second liquid, wherein the first pair of walls and the second pair of walls are respectively disposed at opposite sides of the conductive layer, wherein the conductive layer is deformable by the second pair of walls in response to a surface tension of the second liquid.

13. The semiconductor device of claim 12, further comprising:

a first pad disposed above the insulation layer; and a second pad disposed above the insulation layer, wherein a location of the first pad and a location of the second pad are substantially symmetrical with respect to a center line of the conductive layer, wherein the first pad and the second pad in combination serve as a medium for measuring a resistance of the conductive layer.

14. A method of sensing a change in a level of a liquid contained in a semiconductor device, the semiconductor device including a substrate, a pair of walls disposed on the substrate and configured to define a recess therebetween, and a conductive layer disposed above the substrate, the method comprising:

applying a liquid to completely fill the recess between the pair of walls;

measuring a resistance of the conductive layer in contact with the pair of walls; and determining that the amount of liquid is decreased when the measured resistance is changed.

* * * * *